US012593330B2

(12) United States Patent
Zhang

(10) Patent No.: US 12,593,330 B2
(45) Date of Patent: Mar. 31, 2026

(54) COMMUNICATIONS METHOD AND APPARATUS

(71) Applicant: HUAWEI TECHNOLOGIES CO.,LTD., Guangdong (CN)

(72) Inventor: Xingwei Zhang, Lund (SE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 424 days.

(21) Appl. No.: 17/391,946

(22) Filed: Aug. 2, 2021

(65) Prior Publication Data

US 2021/0368524 A1 Nov. 25, 2021

Related U.S. Application Data

(63) Continuation of application No. PCT/CN2020/073322, filed on Jan. 20, 2020.

(30) Foreign Application Priority Data

Feb. 1, 2019 (CN) .......................... 201910105220.3

(51) Int. Cl.
*H04W 72/1263* (2023.01)
*H04L 1/1867* (2023.01)
(Continued)

(52) U.S. Cl.
CPC ....... *H04W 72/1263* (2013.01); *H04L 1/1896* (2013.01); *H04W 72/0466* (2013.01); *H04W 72/20* (2023.01); *H04W 72/54* (2023.01)

(58) Field of Classification Search
CPC . H04W 72/1263; H04W 72/20; H04W 72/54; H04W 72/0466; H04L 1/1896
(Continued)

(56) References Cited

U.S. PATENT DOCUMENTS

2017/0048922 A1 2/2017 Lee et al.
2018/0035427 A1 2/2018 Gupta et al.
(Continued)

FOREIGN PATENT DOCUMENTS

CN 106256099 A 12/2016
CN 106793092 A 5/2017
(Continued)

OTHER PUBLICATIONS

R1-1901219 (Year: 2019).*
(Continued)

*Primary Examiner* — Intekhaab A Siddiquee

(57) ABSTRACT

A communications method and apparatus are provided, to schedule transmission of sidelink feedback control information after a sidelink feedback mechanism is introduced into a sidelink. The communications method and apparatus may be applied to the Internet of vehicles, for example, V2X, LTE-V, or V2V, or may be applied to fields such as D2D, intelligent driving, and intelligent connected vehicles. The method includes: A first terminal device receives first signaling from a network device or a second terminal device, the first terminal device determines that the first signaling is used to schedule transmission of sidelink feedback control information, and the first terminal device transmits the sidelink feedback control information based on the first signaling, where the sidelink feedback control information includes at least one of channel state information, a receiving response, or a scheduling request.

20 Claims, 10 Drawing Sheets

Network device

Terminal device 1

Terminal device 2

(51) Int. Cl.
    *H04W 72/044*     (2023.01)
    *H04W 72/20*     (2023.01)
    *H04W 72/54*     (2023.01)

(58) Field of Classification Search
    USPC ........................................................ 370/329
    See application file for complete search history.

(56) References Cited

U.S. PATENT DOCUMENTS

| | | | | |
|---|---|---|---|---|
| 2019/0052436 A1* | 2/2019 | Desai | ................... | H04L 5/0055 |
| 2020/0228247 A1* | 7/2020 | Guo | ................... | H04W 52/383 |
| 2022/0060285 A1* | 2/2022 | Zhao | .................... | H04W 72/23 |

FOREIGN PATENT DOCUMENTS

| | | |
|---|---|---|
| CN | 108322414 A | 7/2018 |
| CN | 108347313 A | 7/2018 |
| CN | 110381599 A | 10/2019 |
| WO | 2017084514 A1 | 5/2017 |
| WO | 2018147965 A1 | 8/2018 |
| WO | 2018160372 A1 | 9/2018 |

OTHER PUBLICATIONS

R1-1901227 (Year: 2019).*
R1-1812879, CMCC, Discussion on HARQ feedback and CSI acquisition for sidelink, 3GPP TSG RAN WG 1 Meeting #95, Spokane, USA, Nov. 12-16, 2018, total 5 pages. XP051479126.
Catt et al.,"Discussion on physical layer procedures in NR V2X",3GPP TSG RAN1 Meeting #95, Spokane, USA, Nov. 12-16, 2018, R1-1812618.total:8pages.
Samsung, On Uu-based resource allocation and configuration [online], 3GPP TSG RAN WG1 Ad-Hoc Meeting #AH_1901 R1-1901060, Internet URL:http://www.3gpp.org/ftp/tsg_ran/WG1_RL1/TSGR1_AH/NR_AH_1901/Docs/R1-1901060.zip>, Jan. 11, 2019.
Ericsson, Transmission of sidelink HARQ feedback to gNB for mode 1 scheduling [online], 3GPP TSG RAN WG1 Ad-Hoc Meeting #AH_1901 R1-1901227, Internet URL:http://www.3gpp.org/ftp/tsg_ran/WG1_RL1/TSGR1_AH/NR_AH_1901/Docs/R1-1901227.zip>, Jan. 11, 2019.
ZTE, Sanechips Discussion on PHY procedures for NR V2X[online] 3GPP TSG RAN WG1 Ad-Hoc Meeting 1901, R1-1900775 Jan. 12, 2019, 7 pages.

* cited by examiner

| |
|---|
| Data |
| |
| SA |

Network device

Terminal device 1                    Terminal device 2

COMMUNICATIONS METHOD AND APPARATUS

CROSS-REFERENCE TO RELATED APPLICATIONS

The present disclosure is a continuation of International Application No. PCT/CN2020/073322, filed on Jan. 20, 2020, which claims priority to Chinese Patent Application No. 201910105220.3, filed on Feb. 1, 2019. The disclosures of the aforementioned applications are hereby incorporated by reference in their entireties.

TECHNICAL FIELD

The present disclosure relates to the field of mobile communication technologies, and in particular, to a communications method and apparatus.

BACKGROUND

Currently, in long term evolution (long term evolution, LTE)-based device-to-device (device-to-device, D2D) communication and vehicle-to-everything (vehicle-to-everything, V2X) communication, a physical sidelink control channel (physical sidelink control channel, PSCCH) may be used to carry/transmit control signaling, and a physical sidelink shared channel (physical sidelink shared channel, PSSCH) may be used to carry/transmit data.

There is no sidelink feedback mechanism in an LTE-based D2D (LTE D2D for short) and V2X communications system. When terminal devices communicate with each other, a terminal device serving as a receive end cannot feed back sidelink feedback control information to a terminal device serving as a transmit end, and therefore cannot assist the terminal device serving as the transmit end in better sending a signal (data/signaling) to the terminal device serving as the receive end.

Compared with LTE D2D and V2X, in new radio (new radio, NR)-based sidelink communication, a sidelink feedback mechanism may be introduced. After the sidelink feedback mechanism is introduced, how to schedule transmission of sidelink feedback control information is a technical problem that needs to be resolved.

SUMMARY

Embodiments of the present disclosure provide a communications method and apparatus, to schedule transmission of sidelink feedback control information after a sidelink feedback mechanism is introduced into sidelink communication.

According to a first aspect, the embodiments of the present disclosure provide a communications method. The method may be performed by a first terminal device or a communications apparatus (for example, a chip system) that can support the first terminal device in implementing the method. In the present disclosure, an example in which the first terminal device performs the method is used for description. The method includes: The first terminal device receives first signaling from a network device or a second terminal device, the first terminal device determines that the first signaling is used to schedule transmission of sidelink feedback control information, and the first terminal device transmits the sidelink feedback control information based on the first signaling.

The sidelink feedback control information includes at least one of channel state information, a receiving response, or a scheduling request.

According to the foregoing method, transmission of the sidelink feedback control information may be scheduled by using the first signaling sent by the network device or the second terminal device, and each terminal device does not need to preempt a shared resource. This can avoid a conflict that occurs when transmission of sidelink feedback control information of the terminal devices is scheduled.

In one embodiment of the present disclosure, before sending the first signaling to the first terminal device, the network device or the second terminal device may further generate the first signaling.

In one embodiment of the present disclosure, the first terminal device determines, based on at least one of the following, that the first signaling is used to schedule transmission of the sidelink feedback control information:

a physical downlink control channel (physical downlink control channel, PDCCH) resource or a PSCCH resource corresponding to the first signaling;

a length of the first signaling;

radio network temporary identifier (radio network temporary identifier, RNTI) scrambling used by cyclic redundancy check (cyclic redundancy check, CRC) of the first signaling; or an indication field in the first signaling.

According to this method, the first terminal device may determine, based on a plurality of characteristics of the first signaling, that the first signaling is used to schedule transmission of the sidelink feedback control information.

In one embodiment of the present disclosure, the first signaling includes first indication information, the first indication information is used to indicate a first resource, and the first resource is used to transmit a first channel that carries the sidelink feedback control information. According to this method, the first terminal device may indicate the first resource based on the first indication information carried in the first signaling. Compared with a method in which the first resource is preconfigured for the first terminal device, this method can flexibly configure the first resource.

In one embodiment of the present disclosure, the first channel includes at least one of a physical sidelink feedback channel, a physical sidelink shared channel, a physical sidelink control channel, a physical uplink shared channel, or a physical uplink control channel. In this way, different channels may be flexibly used to carry the sidelink feedback control information.

In one embodiment of the present disclosure, when the first channel includes a physical sidelink shared channel and/or a physical uplink shared channel, the first channel is further used to carry data, and a transmission parameter of the data is the same as a transmission parameter of the sidelink feedback control information; and/or when the first channel includes a physical sidelink control channel and/or a physical uplink control channel, the first channel is further used to carry control signaling, and a transmission parameter of the control signaling is the same as the transmission parameter of the sidelink feedback control information. In this way, the transmission parameter of the sidelink feedback control information may be the same as the transmission parameter of the data or the transmission parameter of the control signaling, and the first signaling may include one transmission parameter, to reduce signaling overheads.

In one embodiment of the present disclosure, the first signaling further includes second indication information, the second indication information is used to indicate a second resource, and the second resource is used to transmit a second channel that carries the data and/or the control signaling. According to this method, the first signaling may include the first indication information and the second indication information, and each indication information is used to indicate a different transmission resource. In this way, signaling overheads can be reduced.

In one embodiment of the present disclosure, when the second channel carries the control signaling, the second channel includes at least one of a physical sidelink control channel or a physical uplink control channel, and/or when the second channel carries the data, the second channel includes at least one of a physical sidelink shared channel or a physical uplink shared channel. In this way, different channels may be flexibly used to carry the control signaling or the data.

In one embodiment of the present disclosure, the first signaling further includes a first transmission parameter, and the first transmission parameter is used to indicate transmission of the first channel and the second channel; or the first signaling includes a first transmission parameter and a second transmission parameter, the first transmission parameter is used to indicate transmission of the first channel, and the second transmission parameter is used to indicate transmission of the second channel.

In one embodiment of the present disclosure, the first signaling further includes third indication information, the third indication information is used to indicate a third resource, and the third resource is used to transmit a third channel that carries the control signaling and/or the data.

In one embodiment of the present disclosure, when the third channel carries the control signaling, the third channel includes at least one of a physical sidelink control channel or a physical uplink control channel, and/or when the third channel carries the data, the third channel includes at least one of a physical sidelink shared channel or a physical uplink shared channel.

In one embodiment of the present disclosure, the first signaling includes a third transmission parameter, and the third transmission parameter is used to indicate transmission of the first channel, the second channel, and the third channel; or the first signaling includes a fourth transmission parameter, a fifth transmission parameter, and a sixth transmission parameter, the fourth transmission parameter is used to indicate transmission of the first channel, the fifth transmission parameter is used to indicate transmission of the second channel, and the sixth transmission parameter is used to indicate transmission of the third channel.

In one embodiment of the present disclosure, the control signaling includes initial transmission control signaling or retransmission control signaling; and/or the data includes initial transmission data or retransmission data; and/or the sidelink feedback control information includes sidelink feedback control information corresponding to the initial transmission data or sidelink feedback control information corresponding to the retransmission data.

According to a second aspect, the embodiments of the present disclosure provide a communications apparatus. The apparatus may be a first terminal device, or may be an apparatus in the first terminal device. The apparatus may include a transceiver module and a processing module. Based on the communications method in the first aspect, the transceiver module may be configured to receive first signaling from a network device or a second terminal device, and the processing module may be configured to determine that the first signaling is used to schedule transmission of sidelink feedback control information, and the transceiver module is configured to transmit the sidelink feedback control information based on the first signaling.

The sidelink feedback control information includes at least one of channel state information, a receiving response, or a scheduling request.

In one embodiment of the present disclosure, the processing module determines, based on at least one of the following, that the first signaling is used to schedule transmission of the sidelink feedback control information:

a PDCCH resource or a PSCCH resource corresponding to the first signaling;

a length of the first signaling;

RNTI scrambling used by CRC of the first signaling; or an indication field in the first signaling.

In one embodiment of the present disclosure, the first signaling includes first indication information, the first indication information is used to indicate a first resource, and the first resource is used to transmit a first channel that carries the sidelink feedback control information.

The transceiver module is configured to transmits the sidelink feedback control information based on the first signaling in the following manner:

transmitting, on the first resource, the first channel that carries the sidelink feedback control information.

In one embodiment of the present disclosure, the first channel includes at least one of a physical sidelink feedback channel, a physical sidelink shared channel, a physical sidelink control channel, a physical uplink shared channel, or a physical uplink control channel.

In one embodiment of the present disclosure, when the first channel includes a physical sidelink shared channel and/or a physical uplink shared channel, the first channel is further used to carry data, and a transmission parameter of the data is the same as a transmission parameter of the sidelink feedback control information; and/or when the first channel includes a physical sidelink control channel and/or a physical uplink control channel, the first channel is further used to carry control signaling, and a transmission parameter of the control signaling is the same as a transmission parameter of the sidelink feedback control information.

In one embodiment of the present disclosure, the first signaling further includes second indication information, the second indication information is used to indicate a second resource, and the second resource is used to transmit a second channel that carries the data and/or the control signaling.

In one embodiment of the present disclosure, when the second channel carries the control signaling, the second channel includes at least one of a physical sidelink control channel or a physical uplink control channel, and/or when the second channel carries the data, the second channel includes at least one of a physical sidelink shared channel or a physical uplink shared channel.

In one embodiment of the present disclosure, the first signaling further includes a first transmission parameter, and the first transmission parameter is used to indicate transmission of the first channel and the second channel; or the first signaling includes a first transmission parameter and a second transmission parameter, the first transmission parameter is used to indicate transmission of the first channel, and the second transmission parameter is used to indicate transmission of the second channel.

In one embodiment of the present disclosure, the first signaling further includes third indication information, the third indication information is used to indicate a third resource, and the third resource is used to transmit a third channel that carries the control signaling and/or the data.

In one embodiment of the present disclosure, when the third channel carries the control signaling, the third channel includes at least one of a physical sidelink control channel or a physical uplink control channel, and/or when the third channel carries the data, the third channel includes at least one of a physical sidelink shared channel or a physical uplink shared channel.

In one embodiment of the present disclosure, the first signaling includes a third transmission parameter, and the third transmission parameter is used to indicate transmission of the first channel, the second channel, and the third channel; or the first signaling includes a fourth transmission parameter, a fifth transmission parameter, and a sixth transmission parameter, the fourth transmission parameter is used to indicate transmission of the first channel, the fifth transmission parameter is used to indicate transmission of the second channel, and the sixth transmission parameter is used to indicate transmission of the third channel.

In one embodiment of the present disclosure, the control signaling includes initial transmission control signaling or retransmission control signaling; and/or the data includes initial transmission data or retransmission data; and/or the sidelink feedback control information includes sidelink feedback control information corresponding to the initial transmission data or sidelink feedback control information corresponding to the retransmission data.

According to a third aspect, the embodiments of the present disclosure provide a communications apparatus. The apparatus may be a network device or a second terminal device, or may be an apparatus in the network device or the second terminal device. The apparatus may include a transceiver module and a processing module. Based on the communications method in the first aspect, the processing module may be configured to generate first signaling, where the first signaling is used to schedule transmission of sidelink feedback control information, and the transceiver module may be configured to send the first signaling to a first terminal device.

The sidelink feedback control information includes at least one of channel state information, a receiving response, or a scheduling request.

In one embodiment of the present disclosure, at least one of the following of the first signaling is used to determine that the first signaling is used to schedule transmission of the sidelink feedback control information:

a physical downlink control channel PDCCH resource or a physical sidelink control channel PSCCH resource corresponding to the first signaling;

a length of the first signaling;

radio network temporary identifier RNTI scrambling used by cyclic redundancy check CRC of the first signaling; or an indication field in the first signaling.

In one embodiment of the present disclosure, the first signaling includes first indication information, the first indication information is used to indicate a first resource, and the first resource is used to transmit a first channel that carries the sidelink feedback control information.

In one embodiment of the present disclosure, the first channel includes at least one of a physical sidelink feedback channel, a physical sidelink shared channel, a physical sidelink control channel, a physical uplink shared channel, or a physical uplink control channel.

In one embodiment of the present disclosure, when the first channel includes a physical sidelink shared channel and/or a physical uplink shared channel, the first channel is further used to carry data, and a transmission parameter of the data is the same as a transmission parameter of the sidelink feedback control information; and/or when the first channel includes a physical sidelink control channel and/or a physical uplink control channel, the first channel is further used to carry control signaling, and a transmission parameter of the control signaling is the same as a transmission parameter of the sidelink feedback control information.

In one embodiment of the present disclosure, the first signaling further includes second indication information, the second indication information is used to indicate a second resource, and the second resource is used to transmit a second channel that carries the data and/or the control signaling.

In one embodiment of the present disclosure, when the second channel carries the control signaling, the second channel includes at least one of a physical sidelink control channel or a physical uplink control channel, and/or when the second channel carries the data, the second channel includes at least one of a physical sidelink shared channel or a physical uplink shared channel.

In one embodiment of the present disclosure, the first signaling further includes a first transmission parameter, and the first transmission parameter is used to indicate transmission of the first channel and the second channel; or the first signaling includes a first transmission parameter and a second transmission parameter, the first transmission parameter is used to indicate transmission of the first channel, and the second transmission parameter is used to indicate transmission of the second channel.

In one embodiment of the present disclosure, the first signaling further includes third indication information, the third indication information is used to indicate a third resource, and the third resource is used to transmit a third channel that carries the control signaling and/or the data.

In one embodiment of the present disclosure, when the third channel carries the control signaling, the third channel includes at least one of a physical sidelink control channel or a physical uplink control channel, and/or when the third channel carries the data, the third channel includes at least one of a physical sidelink shared channel or a physical uplink shared channel.

In one embodiment of the present disclosure, the first signaling includes a third transmission parameter, and the third transmission parameter is used to indicate transmission of the first channel, the second channel, and the third channel; or the first signaling includes a fourth transmission parameter, a fifth transmission parameter, and a sixth transmission parameter, the fourth transmission parameter is used to indicate transmission of the first channel, the fifth transmission parameter is used to indicate transmission of the second channel, and the sixth transmission parameter is used to indicate transmission of the third channel.

In one embodiment of the present disclosure, the control signaling includes initial transmission control signaling or retransmission control signaling; and/or the data includes initial transmission data or retransmission data; and/or the sidelink feedback control information includes sidelink feedback control information corresponding to the initial transmission data or sidelink feedback control information corresponding to the retransmission data.

According to a fourth aspect, a first terminal device is provided. The first terminal device includes a memory and a processor, the memory is configured to store instructions, the processor is configured to execute the instructions stored in the memory, and execution of the instructions stored in the memory enables the processor to perform the method performed by the first terminal device in any one of the first aspect or the possible designs of the first aspect.

According to a fifth aspect, a network device or a second terminal device is provided. The network device or the second terminal device includes a memory and a processor, the memory is configured to store instructions, the processor is configured to execute the instructions stored in the memory, and execution of the instructions stored in the memory enables the processor to perform the method performed by the network device or the second terminal device in any one of the first aspect or the possible designs of the first aspect.

According to a sixth aspect, the embodiments of the present disclosure further provide a computer-readable storage medium, including instructions, and when the instructions are run on a computer, the computer is enabled to perform the method according to any one of the first aspect or the possible designs of the first aspect.

According to a seventh aspect, the embodiments of the present disclosure further provide a computer program product, including instructions, and when the instructions are run on a computer, the computer is enabled to perform the method according to any one of the first aspect or the possible designs in the first aspect.

According to an eighth aspect, the embodiments of the present disclosure provide a chip system. The chip system includes a processor, and may further include a memory, configured to implement the method according to any one of the first aspect or the possible implementations of the first aspect. The chip system may include a chip, or may include a chip and another discrete device.

According to a ninth aspect, the embodiments of the present disclosure provide a communications system. The communications system includes the first terminal device according to any one of the second aspect or the implementations of the second aspect, and the network device or second terminal device according to any one of the third aspect or the implementations of the third aspect.

According to a tenth aspect, the embodiments of the present disclosure provide a communications system. The communications system includes the first terminal device according to the fourth aspect and the network device or second terminal device according to the fifth aspect.

These aspects or other aspects of the present disclosure are further described in relation to the figures of the present disclosure.

DESCRIPTION OF EMBODIMENTS

Figure 1:
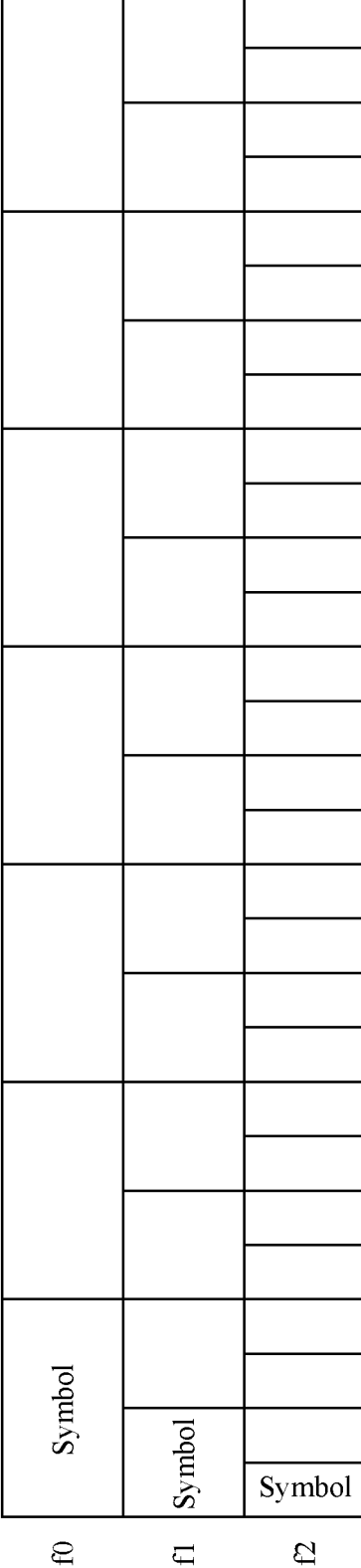
FIG. 1 is a schematic diagram of comparison of symbol lengths at three subcarrier spacings according to an embodiment of the present disclosure.

The following describes the present disclosure in detail with reference to the accompanying drawings in the specification.

Some terms in the present disclosure are first described, to facilitate a better understanding of the present disclosure.

(1) A terminal device includes a device that provides a user with voice and/or data connectivity, for example, may include a handheld device having a wireless connection function, or a processing device connected to a wireless modem. The terminal device may communicate with a core network through a radio access network (radio access network, RAN) and exchange voice and/or data with the RAN. The terminal device may include user equipment (user equipment, UE), a wireless terminal device, a mobile terminal device, a device-to-device (device-to-device, D2D) communications terminal device, a vehicle-to-everything (vehicle to everything, V2X) communications terminal device, a machine-to-machine/machine-type communications (machine-to-machine/machine-type communications, M2M/MTC) terminal device, an Internet of things (Internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, or a portable, pocket-sized, handheld, or computer built-in mobile apparatus, or the like. For example, the terminal device is a personal communications service (personal communication service, PCS) phone, a cordless telephone set, a session initiation protocol (session initiation protocol, SIP) phone, a wireless local loop (wireless local loop, WLL) station, or a personal digital assistant (personal digital assistant, PDA). The terminal device further includes a limited device, for example, a device with low power consumption, a device with a limited storage capability, or a device with a limited computing capability. For example, the terminal device includes an information sensing device such as a barcode, radio frequency identification (radio frequency identification, RFID), a sensor, a global positioning system (global positioning system, GPS), or a laser scanner.

In the embodiments of the present disclosure, if the terminal devices described above are applied to the Internet of vehicles, the terminal devices may be considered as Internet of vehicles terminal devices. For example, if the various terminal devices described above are located in a vehicle (for example, placed in the vehicle or mounted in the vehicle), the terminal devices may be considered as vehicle-mounted terminal devices. For example, the vehicle-mounted terminal devices are also referred to as on-board units (on-board unit, OBU).

(2) In the embodiments of the present disclosure, a network device may be referred to as a RAN device, and includes, for example, an access network (access network, AN) device such as a base station (for example, an access point), and may be a device that communicates with a wireless terminal device over an air interface through one or more cells in an access network. Alternatively, for example, a network device in a V2X technology is a road side unit (road side unit, RSU). The base station may be configured to mutually convert a received over-the-air frame and a received Internet protocol (IP) packet, and serve as a router between the terminal device and the other parts of the access network, where the other parts of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB, eNB, or e-NodeB, evolutional NodeB) in an LTE system or a long term evolution-advanced (long term evolution-advanced, LTE-A) system, may include a next generation NodeB (next generation NodeB, gNB) in an NR system, or may include a centralized unit (centralized unit, CU) and a distributed unit (distributed unit, DU) in a cloud radio access network (cloud radio access network, Cloud RAN) system. This is not limited in the embodiments of the present disclosure.

(3) 5G is a fifth generation mobile communications technology. 5G has higher performance than 4G. 5G NR Rel-15 defines a new air-interface access technology to support a user experience rate of 0.1 Gbps to 1 Gbps, a connection density of one million connections per square kilometer, an end-to-end millisecond-level latency, a traffic density of dozens of Tbps per square kilometer, mobility of over 500 Km per hour, and a peak rate of dozens of Gbps. The user experience rate, the connection density, and the latency are three most basic performance indicators for 5G. In addition, efficiency of network deployment and operation needs to be greatly improved in 5G. Compared with 4G, in 5G, spectrum efficiency is increased by 5 to 15 times, and energy efficiency and cost efficiency are increased by more than 100 times.

Three major application scenarios and requirements of 5G include:

enhanced mobile broadband (enhanced mobile broad-band, eMBB);

massive machine-type communications (massive machine-type communications, mMTC); and ultra-reliable and low-latency communications (ultra-reliable and low-latency communications, URLLC).

A corresponding URLLC scenario includes unmanned driving, industrial control, or the like, and requires a low latency and high reliability. Specific requirements for the low latency are an end-to-end 0.5 ms latency and a 1 ms round-trip latency of air-interface information exchange, and a specific requirement for the high reliability is that a block error rate (block error ratio, BLER) reaches $10^{\wedge}(-5)$, that is, a proportion of correctly received data packets reaches 99.999%.

A plurality of subcarrier spacings are introduced into an NR system. Different carriers or different bandwidth parts (bandwidth part, BWP) in a carrier may have different subcarrier spacings. A baseline is 15 kHz. A subcarrier spacing of each carrier may be 15 kHz×2^n, where n is an integer. There are eight subcarrier spacings in total from 3.75 kHz, 7.5 kHz, to 480 kHz. Certainly, there may be other possibilities in the future. Corresponding to different subcarrier spacings, there are also different symbol lengths and slot lengths. FIG. 1 shows comparison between symbol lengths at three subcarrier spacings, where f0, f1, and f2 represent the three subcarrier spacings. For example, f1 is twice a length of f0. In this case, a symbol length at f0 is twice a symbol length at f1. For example, f2 is twice a length of f1. Likewise, the symbol length at f1 is twice a symbol length at f2.

In time domain, in the NR system, one slot may include at least one of downlink transmission, a guard period (guard period, GP), uplink transmission, and the like. Such slot structures are referred to as different slot format indicators (slot format indicator, SFI). Currently, there may be a maximum of 256 slot structures, and certainly, a possibility that there are other slot structures in the future is not excluded.

In frequency domain, because a bandwidth of a single carrier in the NR system may reach 400 MHz, a bandwidth part (bandwidth part, BWP) is further defined in one carrier, to adapt to a bandwidth capability of the terminal device. The base station may configure a plurality of downlink (downlink, DL) BWPs/uplink (uplink, UL) BWPs for the terminal device by using radio resource control (radio resource control, RRC), and activate one configured DL BWP and one configured UL BWP for the terminal device by using downlink control information (downlink control information, DCI). Therefore, in one carrier, the base station may configure a plurality of DL BWPs/UL BWPs for the terminal device. However, at one moment, there is only one active DL BWP and one active UL BWP. When the activated BWP needs to be switched, the base station switches the activated BWP from a BWP 1 to a BWP 2 by using the DCI. Currently, it is considered that DCI used for downlink scheduling can indicate only to switch an active DL BWP, and after receiving the DCI used for downlink scheduling, the terminal device switches the active DL BWP to a new DL BWP to receive a physical downlink shared channel (physical downlink shared channel, PDSCH); signaling used for uplink scheduling can indicate only to switch an active UL BWP, and after receiving the signaling used for uplink scheduling, the terminal device switches the active UL BWP to a new UL BWP to send a physical uplink shared channel (physical uplink shared channel, PUSCH).

A base station gNB in the NR system may share a spectrum with a base station eNB in the LTE system. For example, on an uplink carrier, the base station gNB in the NR system and the base station eNB in the LTE system may coexist, to form intra-frequency networking.

From a perspective of the terminal device, the terminal device in the 5G system may support dual connectivity. In other words, one terminal device may be connected to two base stations. When the terminal device is connected to both an LTE base station and an NR base station, if the LTE base station serves as a master base station, and the NR base station serves as a secondary base station, this scenario is specifically referred to as LTE-NR dual connectivity (LTE- NR dual connectivity, EN-DC). If the NR base station serves as a master base station and the LTE base station serves as a secondary base station, this scenario is specifically referred to as NR-LTE dual connectivity (NR-LTE dual connectivity, NE-DC). In addition, if the terminal device is connected to two NR base stations, this scenario is specifically referred to as an NR-NR dual connectivity (NR-NR dual connectivity, NN-DC).

(4) Device-to-device (device-to-device, D2D) communication: To improve spectrum utilization and fully utilize a radio frequency capability of an existing terminal device, it is considered that a spectrum resource of an existing mobile communications network is reused on a D2D communications link (sidelink, SL). Because an anti-interference capability of a base station is stronger than an anti-interference capability of a terminal device, to avoid interfering with a terminal device of an existing network, in D2D communication, a spectrum resource of a downlink (downlink) of an LTE-A system is not used, but only a spectrum resource of an uplink (uplink) of the LTE-A system is reused. A probability that a D2D device performs time division multiplexing on the uplink spectrum resource is relatively high. In this case, receiving and sending do not need to be simultaneously supported. Only sending or receiving needs to be performed at one moment. The downlink of the LTE-A system is a link from the eNB to the terminal device, and the uplink of the LTE-A system is a link from the terminal device to the eNB.

Figure 2:
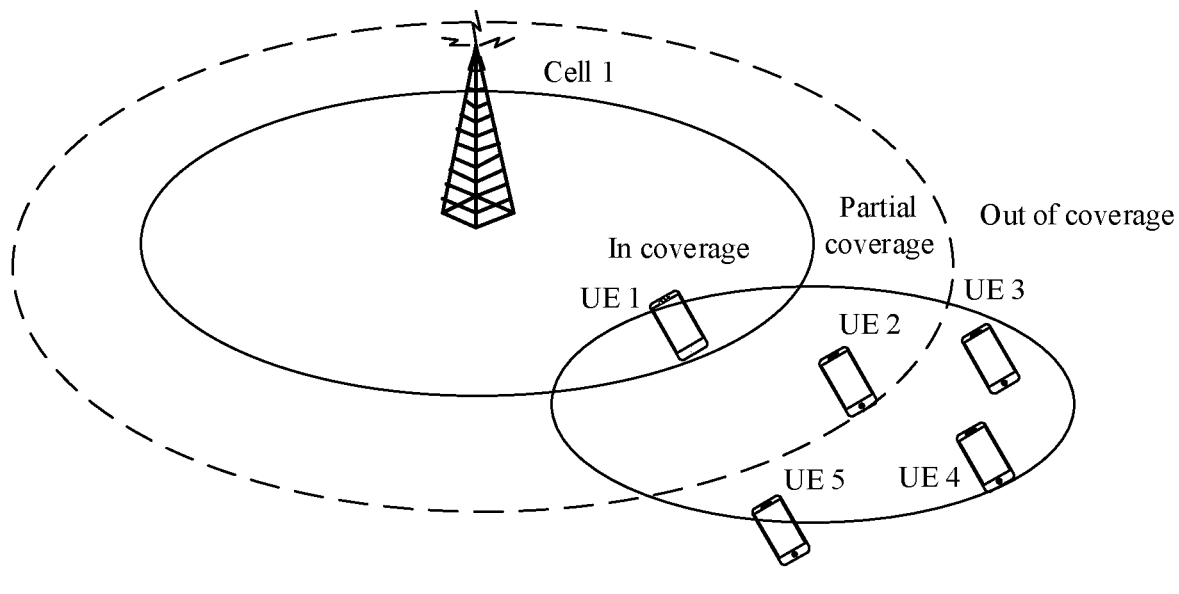
FIG. 2 is a schematic diagram of a network architecture in a D2D scenario according to an embodiment of the present disclosure.

In Release (release)-12/13, a D2D scenario may be classified into three types: an in-coverage scenario, a partial coverage scenario, and an out-of-coverage scenario, as shown in FIG. 2. UE is used as an example of the terminal device in FIG. 2. In the in-coverage scenario, a D2D device is within coverage of a base station. For example, UE 1 in FIG. 2 is UE in coverage. In the partial coverage scenario, some D2D devices are within coverage of a base station. For example, UE 2 in FIG. 2 is UE in partial coverage. Some other D2D devices are out of coverage of the base station. For example, UE 3, UE 4, and UE 5 in FIG. 2 are UEs out of coverage. If a terminal device can receive a signal from a network device, the terminal device is a terminal device in coverage. If a terminal device can receive a signal from a terminal device in coverage, the terminal device is a terminal device in partial coverage. If a terminal device can receive neither a signal sent by the base station nor a signal sent by a terminal device in coverage, the terminal device is a terminal device out of coverage.

A D2D communication process may be divided into two processes: a D2D device discovery process and a D2D device communications process. In the D2D device discovery process, a D2D device sends only a discovery signal, and usually sends the discovery signal through a physical sidelink discovery channel (physical sidelink discovery channel, PSDCH). After receiving the discovery signal, another D2D device may perform handshake with the D2D device that sends the discovery signal. In the D2D device communications process, the D2D device may send control signaling and data. The control signaling is, for example, a scheduling assignment (scheduling assignment, SA). The SA has different sidelink control information (sidelink control information, SCI) formats. The control signaling is usually sent through a PSCCH, and the data is usually sent through a PSSCH. Compared with an uplink (UL) and a downlink (DL) in LTE, a D2D communications link may be referred to as a sidelink (sidelink).

From a perspective of a signal transmit end, currently, there are two modes for resource allocation in the D2D device communication process. A mode 1 (mode 1) is a centralized control method. A D2D resource is allocated by a central control device (for example, a base station or a relay station). The resource is allocated, through scheduling, to a terminal device serving as the signal transmit end for use. A resource allocation manner in the centralized control method is mainly applied to the in-coverage scenario. A mode 2 (mode 2) is a contention-based distributed resource multiplexing method. A terminal device serving as the signal transmit end obtains a sending resource from a resource pool through contention. In the in-coverage scenario, the resource pool is a whole block of resources configured by the base station, and D2D devices contend for small blocks of resources in the whole block of resources. In the out-of-coverage scenario, the resource pool is a predefined system resource that can be obtained by the D2D device, and D2D devices contend for a resource from predefined system resources.

Similar to the D2D device communication process, there are also two types of resource allocation in the D2D device discovery process. A type 1 (type 1) is a contention-based distributed resource multiplexing method. A terminal device serving as a signal transmit end obtains a sending resource from a resource pool through contention. In the in-coverage scenario, the resource pool is a whole block of resources configured by the base station, and D2D devices contend for small blocks of resources in the whole block of resources. In the out-of-coverage scenario, the resource pool is a predefined system resource that can be obtained by the D2D device, and D2D devices contend for a resource from predefined system resources. A type 2 (type 2) is a centralized control method. A D2D resource is allocated by a central control device (for example, a base station or a relay station). The resource is allocated, through scheduling, to a terminal device serving as a signal transmit end for use. A resource allocation manner in the centralized control method is mainly applied to the in-coverage scenario.

For contention-based resource allocation manners such as the mode 2 and the type 1, due to lack of coordination by a central controller, different D2D devices may contend for a same resource, causing a conflict. When a quantity of D2D devices is relatively large, a conflict probability is quite high.

Figure 3:
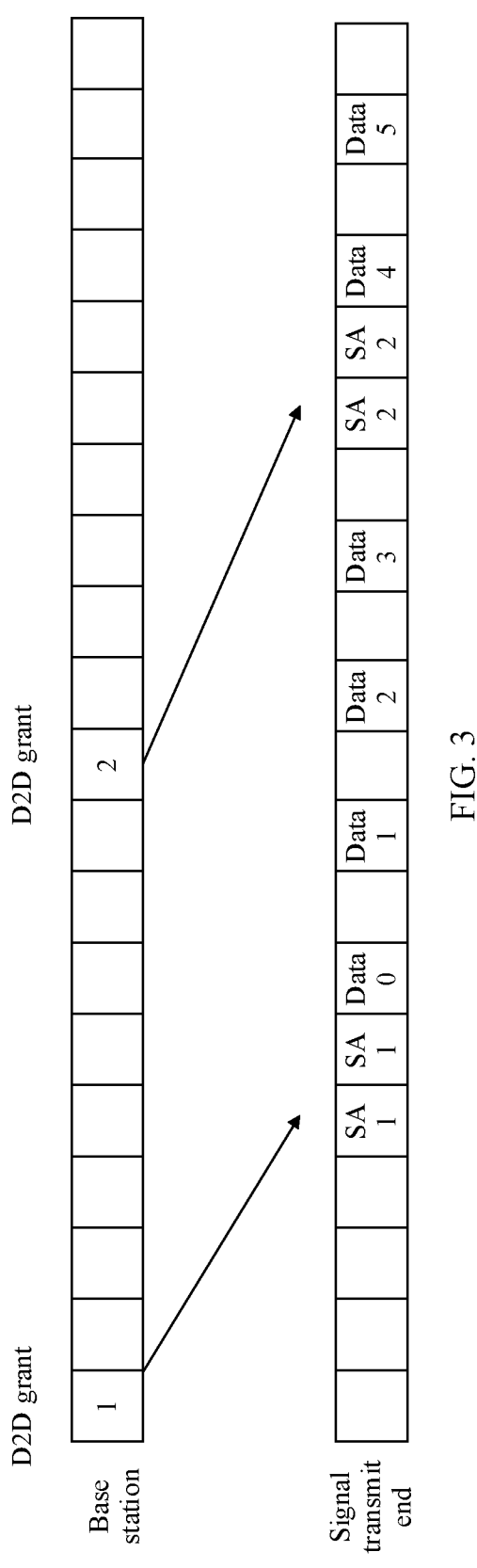
FIG. 3 is a schematic diagram of a mode 1 in a D2D communications process according to an embodiment of the present disclosure.

For the D2D device communication process, generally, the signal transmit end first sends an SA. It is stipulated in the LTE system that the SA is repeatedly sent for two times. The SA carries related information of data. Then the signal transmit end sends the data. It is stipulated in the LTE system that the data is repeatedly sent for four times. FIG. 3 is a schematic diagram of the mode 1. For example, both a block 1 and a block 2 indicate that a base station sends a D2D grant (grant), and the D2D grant is used to schedule a resource used to send an SA and data, for example, the D2D grant represented by the block 1 is used to schedule resources for an SA 1 and data 0 to data 3 in the following row, and the D2D grant represented by the block 2 is used to schedule resources for an SA 2 and data 4 and data 5 in the following row. This is similar for the mode 2, except that there is no process in which the base station schedules a resource, and a resource used to send an SA and data is determined by the terminal device serving as the signal transmit end through contention. A signal receive end first blindly detects an SA. If the SA is correctly received, and an identification number (ID) carried in the SA matches at least one ID in an ID list of the signal receive end, it indicates that the SA is sent to the signal receive end. In this case, the signal receive end receives subsequent data based on related information of data carried in the SA.

A format used by the SA may be a sidelink control information (sidelink control information, SCI) format (format) 0, namely, an SCI format 0, and fields (related information of data) included in the SCI format 0 are shown in Table 1.

TABLE 1

| Fields (fields) | Bits (bits) | Descriptions (descriptions) |
|---|---|---|
| Frequency hopping (frequency hopping, FH) | 1 | Whether or not to use frequency hopping (Whether or not to use frequency hopping) A frequency hopping pattern is fixed in the specification (The frequency hopping pattern is fixed in the specification) |
| Resource block assignment (resource block assignment), that is, frequency position of data resource (frequency position of data resource) | 5-13 | An uplink type 0 resource position can be reused (UL type 0 resource allocation can be reused) |
| Time position of a data resource (time position of data resource, TRP) | 7 | Bitmap (bitmap) |
| Modulation and coding scheme (modulation and coding scheme, MCS) | 5 | 64 quadrature amplitude modulation (64 quadrature amplitude modulation, 64 QAM) precluded (precluded) |
| Timing advance (timing advance, TA) | 11 | Reception timing adjustment of data (reception timing adjustment of data) |
| ID | 8 | Destination (destination) ID |
| Total (total) | 37-45 | |

(5) V2X: In Release Rel-14/15/16, V2X is successfully initiated as a main application of the D2D technology. Based on an existing D2D technology, a specific application requirement of the V2X is optimized in the V2X, to further reduce an access latency of a V2X device and resolve a resource conflict problem.

Figures 4, 5:
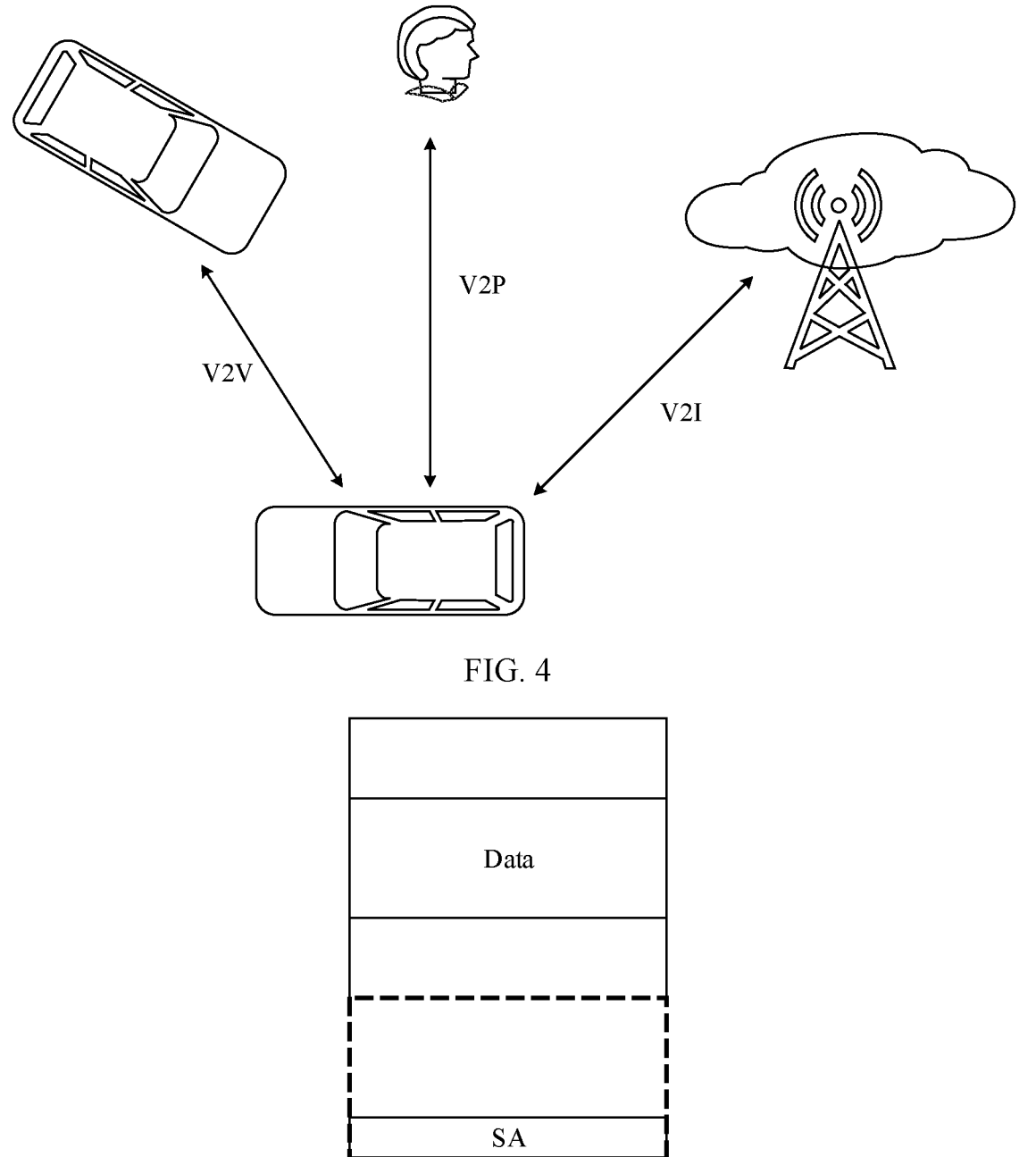
FIG. 4 is a schematic diagram of a V2V network architecture according to an embodiment of the present disclosure.
FIG. 5 is a schematic diagram of sending SA and data by a signal transmit end according to an embodiment of the present disclosure.

Further, the V2X specifically includes three application requirements: V2V, V2P, and V2I/N, as shown in FIG. 4. The V2V is communication between vehicles. The V2P is communication between a vehicle and a person (including a pedestrian, a cyclist, a driver, a passenger, or the like). The V2I is communication between a vehicle and a network device. The network device is, for example, a road side unit (road side unit, RSU). In addition, V2N may be included in the V2I, and the V2N is communication between a vehicle and a base station/network.

The RSU includes two types: a terminal-type RSU and a base station-type RSU. Because the terminal-type RSU is deployed on a roadside, the terminal-type RSU is in a non-mobile state, and mobility does not need to be considered. The base station-type RSU can provide timing synchronization and resource scheduling for a vehicle that communicates with the base station-type RSU.

For LTE V2X communication, to ensure a latency requirement, the signal transmit end may simultaneously send an SA and data in one subframe, as shown in FIG. 5. The signal receive end first blindly detects an SA, and needs to buffer data in a same subframe, because data scheduled by the SA may be in the same subframe. If the SA is correctly received and an ID carried in the SA matches an ID of the signal receive end, the signal receive end determines, based on related information of the data carried in the SA, whether to demodulate or decode the buffered data in the same subframe or receive data in a subsequent subframe. In a manner shown in FIG. 5, a resource used to send the SA and a resource used to send the data have respective resource pools. A part shown in a dashed-line box in FIG. 5 is the resource pool of the SA, and a remaining part other than the part in the dashed-line box is the resource pool of the data.

Figure 6:
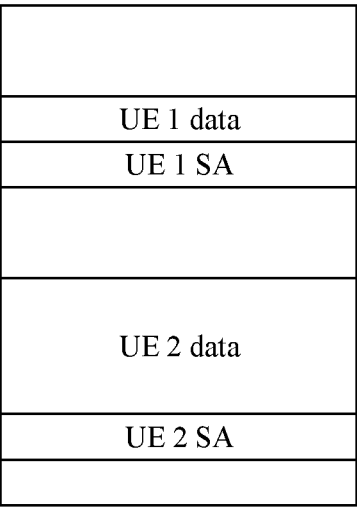
FIG. 6 is another schematic diagram of sending SA and data by a signal transmit end according to an embodiment of the present disclosure.

To reduce a peak to average power ratio (peak to average power ratio, PAPR), for a terminal device, a resource used to send an SA and a resource used to send data are preferably contiguous in frequency domain. Therefore, in another feasible method, the SA and the data share a resource pool. The SA and the data may be continuously placed in frequency domain, as shown in FIG. 6.

Figure 7A:
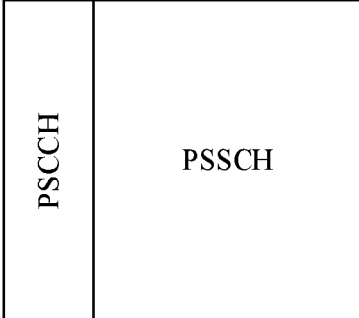
FIG. 7A to FIG. 7E are schematic diagrams of several multiplexing manners of control information and data in V2X.
Figure 7B:
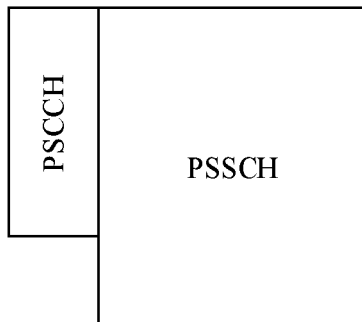
Figure 7C:
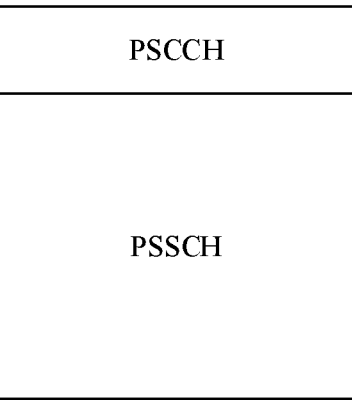
Figure 7D:
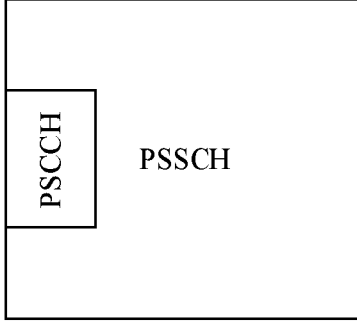
Figure 7E:
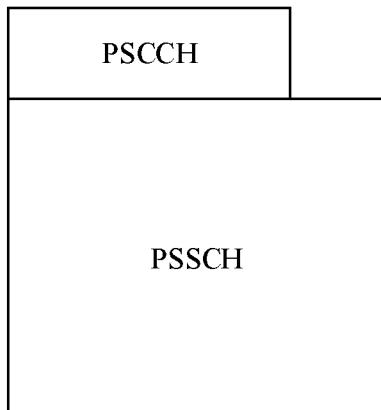

In an NR system, V2X communication may support a plurality of multiplexing manners of control information and data, for example, the following five manners:

1. a time division multiplexing (time division multiplexing, TDM) manner, where a frequency domain bandwidth occupied by the data is the same as a frequency domain bandwidth occupied by the control information, referring to FIG. 7A;

2. a TDM manner, where a frequency domain bandwidth occupied by the data is different from a frequency domain bandwidth occupied by the control information, but a start position of a frequency domain resource occupied by the data is the same as a start position of a frequency domain resource occupied by the control information, referring to FIG. 7B;

3. an FDM manner, where a time domain length of the data is the same as a time domain length of the control information, referring to FIG. 7C;

4. an embedded multiplexing manner of the data and the control information, where a resource occupied by the control information is located in a region of a resource occupied by the data; in other words, the control information reuses a part of the resource of the data, referring to FIG. 7D; and 5. an FDM manner, where a time domain length of the data is different from a time domain length of the control information, but a start position of the data in time domain is the same as a start position of the control information in time domain, referring to FIG. 7E.

(6) The terms "system" and "network" may be used interchangeably in the embodiments of the present disclosure. "At least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "I" usually represents an "or" relationship between the associated objects. "At least one of the following" or a similar expression indicates any combination of the items, and includes any combination of singular items or plural items. For example, at least one item (piece) of a, b, or c may represent a, b, c, a and b, a and c, b and c, or a, b, and c, where a, b, and c may be singular or plural.

In addition, unless otherwise stated, ordinal numbers such as "first" and "second" in the embodiments of the present disclosure are used to distinguish between a plurality of objects, but are not intended to limit a sequence, a time sequence, priorities, or importance degrees of the plurality of objects.

Currently, there is no sidelink feedback mechanism in an LTE D2D communications system. When terminal devices communicate with each other, a terminal device serving as a receive end cannot send, to a terminal device serving as a transmit end, sidelink feedback control information, for example, information such as channel state information of a sidelink channel, a receiving response (for example, an acknowledgement (acknowledgement, ACK)/negative acknowledgement (negative acknowledgement, NACK)), or a scheduling request, and therefore cannot assist the terminal device serving as the transmit end in better sending a signal (data/signaling) to the terminal device serving as the receive end.

Compared with the LTE D2D, in an NR D2D communications system, a sidelink feedback mechanism may be introduced, so that sidelink feedback control information may be transmitted between terminal devices in D2D communication, to further assist the terminal device serving as the transmit end in better sending a signal to the terminal device serving as the receive end. Currently, there is no method for scheduling transmission of the sidelink feedback control information.

Figure 8:
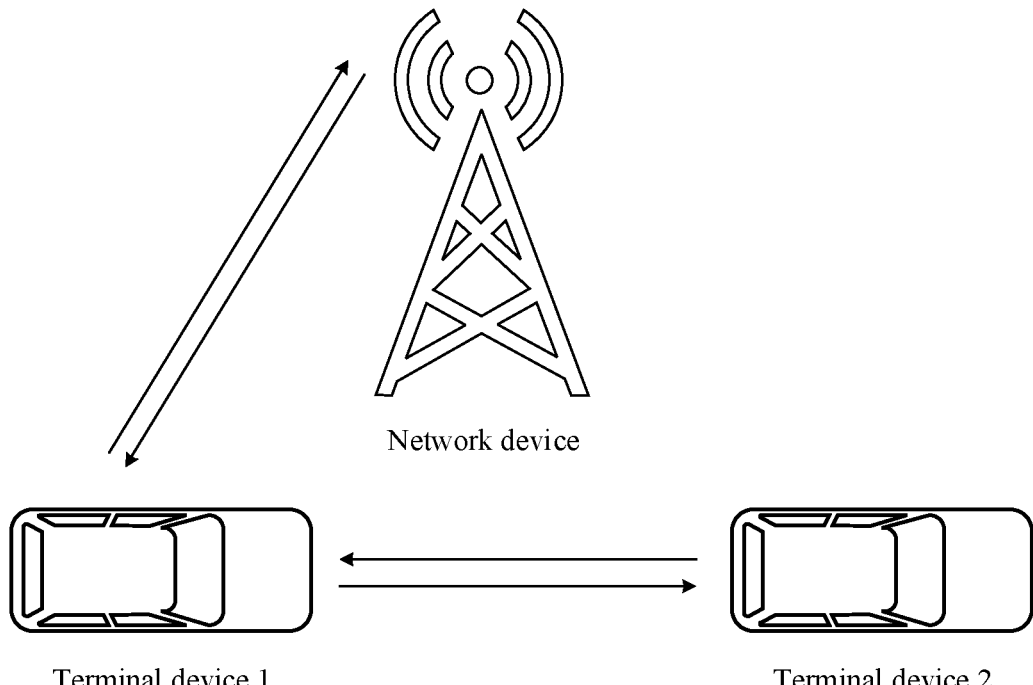
FIG. 8 is a schematic diagram of an application scenario according to an embodiment of the present disclosure.

The following further describes the foregoing existing problem by using an example in which the D2D communication is V2X communication. FIG. 8 is a schematic diagram of a network architecture to which the embodiments of the present disclosure are applied. FIG. 8 shows a V2X network architecture. The V2X network architecture includes a network device and two terminal devices: a terminal device 1 and a terminal device 2. Both the two terminal devices may be connected to the network device. Alternatively, in the two terminal devices, only the terminal device 1 may be connected to the network device, and the terminal device 2 is not connected to the network device. The two terminal devices may alternatively communicate with each other through a sidelink. When the terminal device 1 communicates with the terminal device 2 through the sidelink, it is assumed that the terminal device 1 sends data and/or control signaling to the terminal device 2, and the terminal device 2 receives the data and/or the control signaling sent by the terminal device 1. In the present disclosure, the terminal device 1 that sends the data and/or the control signaling is referred to as a transmitting/sending terminal device, and the terminal device that receives the data and/or the control signaling is referred to as a receiving/ feedback terminal device. A quantity of terminal devices in FIG. 8 is merely an example. In actual application, a V2X network architecture may include a plurality of terminal devices. The network device in FIG. 8 may be, for example, an access network device such as a base station. The access network device corresponds to different devices in different systems. For example, the access network device may correspond to an eNB in a fourth generation mobile communication technology (the 4th generation, 4G) system, and correspond to a 5G access network device, for example, a gNB, in a 5G system. The terminal device in FIG. 8 may be a vehicle-mounted terminal device or a vehicle.

Based on the network architecture shown in FIG. 8, currently there is no sidelink feedback mechanism. When the terminal device 1 communicates with the terminal device 2, a terminal device (for example, the terminal device 2) serving as a receive end cannot send sidelink feedback control information to a terminal device (for example, the terminal device 1) serving as a transmit end. Currently, the sidelink feedback mechanism is introduced into the network architecture in NR V2X, so that sidelink feedback control information can be transmitted between the terminal device 1 and the terminal device 2, to further assist the terminal device (for example, the terminal device 1) serving as the transmit end in better sending a signal to the terminal device (for example, the terminal device 2) serving as the receive end. However, how to schedule transmission of the sidelink feedback control information after the sidelink feedback mechanism is introduced is a technical problem that needs to be resolved.

In view of this, the embodiments of the present disclosure provide a communications method, to schedule transmission of the sidelink feedback control information. The communications method provided in the embodiments of the present disclosure may be applied to a V2X scenario, which may be an NR V2X scenario, an LTE V2X scenario, or the like, or may be applied to an M2M/MTC scenario, or may be applied to another scenario or another communications system. This is not specifically limited. An example in which the communications method provided in the embodiments of the present disclosure is applied to a V2X scenario is used for description below.

Figure 9:
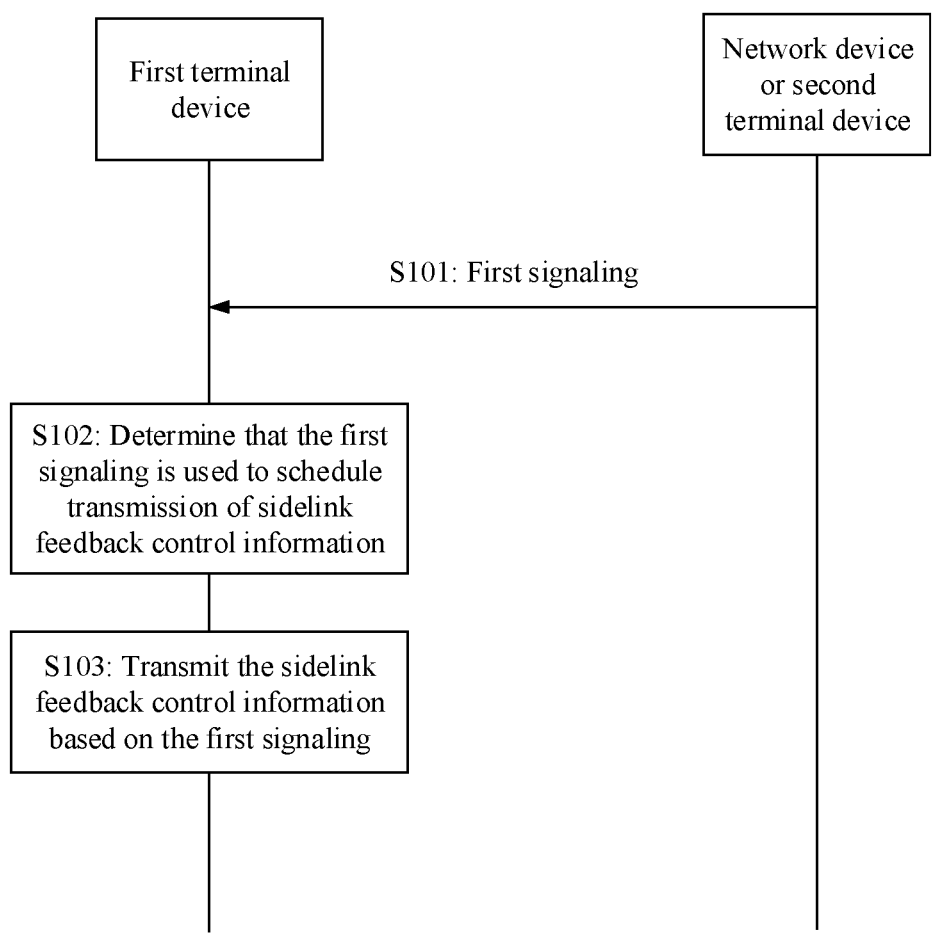
FIG. 9 is a flowchart of a communications method according to an embodiment of the present disclosure.

FIG. 9 is a schematic flowchart of a communications method according to the present disclosure. As shown in FIG. 9, the method includes the following steps.

S101: A first terminal device receives first signaling from a network device or a second terminal device.

S102. The first terminal device determines that the first signaling is used to schedule transmission of sidelink feedback control information (sidelink feedback control information, SFCI). This may also be understood as: The first terminal device determines that the first signaling is used to trigger transmission of the sidelink feedback control information.

In this embodiment of the present disclosure, the first terminal device may be a sending terminal device (for example, the terminal device 1 in FIG. 8), or may be a feedback terminal device (for example, the terminal device 2 in FIG. 8). This is not limited in the present disclosure. When the first terminal device is a feedback terminal device (for example, the terminal device 2 in FIG. 8), the second terminal device may be a sending terminal device (for example, the terminal device 1 in FIG. 8). The sending terminal device may be understood as a terminal device that sends data and/or control signaling, and the feedback terminal device may be understood as a terminal device that feeds back the sidelink feedback control information.

In this embodiment of the present disclosure, the sidelink feedback control information may include but is not limited to at least one of channel state information (channel state information, CSI), a receiving response (hybrid automatic repeat request (hybrid automatic repeat request, HARQ)-ACK)), or a scheduling request (scheduling request, SR). In this embodiment of the present disclosure, the receiving response may include but is not limited to at least one of an ACK, a NACK, and discontinuous transmission (discontinuous transmission, DTX). The channel state information may include but is not limited to at least one of a channel quality indicator (channel quality indicator, CQI), a precoding matrix indicator (precoding matrix indicator, PMI), a rank indicator (rank indicator, RI), reference signal received power (reference signal received power, RSRP), reference signal received quality (reference signal received quality, RSRQ), a path loss (pathloss, PL), a sounding reference signal (sounding reference signal, SRS) resource indicator (SRS resource indicator, SRI), a channel state information-reference signal (channel state information-reference signal, CSI-RS) resource indicator (CSI-RS resource indicator, CRI), a received signal strength indicator (received signal strength indicator, RSSI), a precoding type indicator (precoding type indicator, PTI), a vehicle moving direction, and an interference condition.

In this embodiment of the present disclosure, the first signaling may include but is not limited to at least one of radio resource control (radio resource control, RRC) configuration signaling, downlink control information (downlink control information, DCI), a medium access control control element (medium access control control element, MAC CE), a master information block (master information block, MIB), or a system information block (system information block, SIB).

It should be noted that, in an example in which the first signaling is DCI, if the sidelink feedback control information includes CSI, the DCI may include a CSI field or another related parameter, and the CSI field is used to trigger aperiodic CSI or semi-persistent channel state information (semi-persistent-CSI, SP-CSI). If the sidelink feedback control information includes a HARQ-ACK, the DCI may include an ACK/NACK resource indicator (ACK/NACK resource indicator, ARI) field, an ACK/NACK resource offset (ACK/NACK resource offset, ARO) field, HARQ timing, or another related parameter. The ARI is used to indicate a resource that is used to transmit the HARQ-ACK and that is in a plurality of resources configured by the terminal device by using RRC. The ARO is used to indicate the terminal device to add an offset based on a resource configured by using the RRC. The HARQ timing is used to indicate timing for feeding back the HARQ-ACK by the terminal device.

S103: The first terminal device transmits the sidelink feedback control information based on the first signaling.

It may be understood that after a sidelink feedback mechanism is introduced into a V2X scenario, not only data and control signaling need to be scheduled, but also the sidelink feedback control information needs to be scheduled. This embodiment of the present disclosure provides the following two scheduling methods.

Method 1: The network device or the second terminal device schedules transmission of the data, the control signaling, or the sidelink feedback control information by using different signaling. In this embodiment of the present disclosure, scheduling of transmission of the sidelink feedback control information is used as an example for description. For a method for scheduling transmission of the data or the control signaling, refer to a method for scheduling transmission of the sidelink feedback control information.

According to the method 1, in a possible implementation, the first terminal device may determine, based on at least one of the following, that the first signaling is used to schedule transmission of the sidelink feedback control information:

1. a physical downlink control channel (physical downlink control channel, PDCCH) resource or a PSCCH resource corresponding to the first signaling, where the PDCCH resource corresponding to the first signaling may be at least one of a time domain resource, a frequency domain resource, a code domain resource, a space domain resource, or a power domain resource; specifically, the PDCCH resource corresponding to the first signaling may be a PDCCH resource used to transmit the first signaling; and the PDCCH resource used to transmit the first signaling may include, for example, a control resource set (control resource set, CORESET), a search space set (search space set), a monitoring occasion (monitoring occasion), a candidate (candidate), a control channel element (control channel element, CCE), and an aggregation level (aggregation level, AL);

2. a length of the first signaling, where the length of the first signaling may be a length including a cyclic redundancy check (cyclic redundancy check, CRC) check bit, or may be a length not including a CRC check bit;

3. radio network temporary identifier (radio network temporary identifier, RNTI) scrambling used by CRC of the first signaling; and 4. an indication field in the first signaling, where the indication field may include one or more bits (bit), the indication field may indicate that the sidelink feedback control information scheduled by using the first signaling is channel state information and/or a receiving response and/or a scheduling request, the indication field may indicate whether the first signaling schedules the sidelink feedback control information and/or the data and/or the control signaling, and the indication field may further indicate whether the data or the control signaling scheduled by using the first signaling carries the sidelink feedback control information.

The following describes the foregoing possible implementation by using specific examples. For example, it is assumed that the network device or the second terminal device schedules transmission of the sidelink feedback control information by using the first signaling, and schedules transmission of the data and/or the control signaling by using second signaling; and a PDCCH resource used to transmit the first signaling is a CORESET 1, and a PDCCH resource used to transmit the second signaling is a CORESET 2; or a PDCCH resource used to transmit the first signaling is located in a search space set 1, and a PDCCH resource used to transmit the second signaling is located in a search space set 2. After receiving the first signaling and the second signaling, the first terminal device may determine, by using the PDCCH resources corresponding to the first signaling and the second signaling, that the first signaling is signaling used to schedule transmission of the sidelink feedback control information, and the second signaling is signaling used to schedule transmission of the data and/or the control signaling. For another example, it is assumed that the network device or the second terminal device schedules transmission of the sidelink feedback control information by using the first signaling, and schedules transmission of the data and/or the control signaling by using second signaling, a length of the first signaling is A, a length of the second signaling is B, and A and B are different values. After receiving the first signaling and the second signaling, the first terminal device may determine, based on the lengths of the first signaling and the second signaling, that the first signaling is signaling used to schedule transmission of the sidelink feedback control information, and the second signaling is signaling used to schedule transmission of the data and/or the control signaling. For another example, it is assumed that the network device or the second terminal device schedules transmission of the sidelink feedback control information by using the first signaling, and schedules transmission of the data and/or the control signaling by using second signaling, the CRC of the first signaling uses SFCI-RNTI scrambling, and CRC of the second signaling uses C-RNTI scrambling. After receiving the first signaling and the second signaling, the first terminal device may determine, based on the RNTI scrambling used by the CRC of the first signaling and the second signaling, that the first signaling is signaling used to schedule transmission of the sidelink feedback control information, and the second signaling is signaling used to schedule transmission of the data and/or the control signaling. For another example, it is assumed that the network device or the second terminal device schedules transmission of the sidelink feedback control information by using the first signaling, and schedules transmission of the data and/or the control signaling by using second signaling; the first signaling and the second signaling each include an indication field, and the indication field is 1 bit; a value of the bit included in the first signaling is 0, and when the value of the bit is 0, it indicates that the first signaling is used to schedule transmission of the sidelink feedback control information; and a value of the bit included in the second signaling is 1, and when the value of the bit is 1, it indicates that the second signaling is used to schedule transmission of the data and/or the control signaling. After receiving the first signaling and the second signaling, the first terminal device may determine, by using the indication fields included in the first signaling and the second signaling, that the first signaling is signaling used to schedule transmission of the sidelink feedback control information, and the second signaling is signaling used to schedule transmission of the data and/or the control signaling.

In this embodiment of the present disclosure, a resource used to transmit the sidelink feedback control information may be configured by the network device or the second terminal device for the first terminal device by using the first signaling or may be predefined.

In a possible implementation, the network device or the second terminal device configures, for the first terminal device by using the first signaling, the resource used to transmit the sidelink feedback control information. In this implementation, the first signaling may include first indication information, the first indication information is used to indicate a first resource, and the first resource is used to transmit a first channel that carries the sidelink feedback control information. In this implementation, that the first terminal device transmits the sidelink feedback control information based on the first signaling includes: The first terminal device transmits, on the first resource, the first channel that carries the sidelink feedback control information. It should be noted that carrying in the present disclosure may also be understood as bearing. It should be noted that, in this implementation, the network device may notify a feedback terminal device of the first resource. Alternatively, the network device may notify a sending terminal device of the first resource, and then the sending terminal device notifies a feedback terminal device of the first resource. When the sending terminal device notifies the feedback terminal device of the first resource, the network device may further use 1 bit in the first signaling to indicate whether to notify the sending terminal device or the feedback terminal device of the first resource.

In the foregoing possible implementation, the first channel may be used to carry only the sidelink feedback control information. In this case, the first channel may be a dedicated channel dedicated to carry the sidelink feedback control information. For example, the dedicated channel may be referred to as a physical sidelink feedback channel. Alternatively, the first channel may be used to carry both the data and the sidelink feedback control information. In this case, the first channel may be a physical sidelink shared channel and/or a physical uplink shared channel. Alternatively, the first channel may be used to carry both the control signaling and the sidelink feedback control information. In this case, the first channel may be a physical sidelink control channel and/or a physical uplink control channel.

In this embodiment of the present disclosure, the control signaling may include initial transmission control signaling or retransmission control signaling. The data may include initial transmission data or retransmission data. The sidelink feedback control information may include sidelink feedback control information corresponding to the initial transmission data or sidelink feedback control information corresponding to the retransmission data. In the present disclosure, a physical sidelink control channel corresponding to the initial transmission control signaling may be referred to as an initial transmission physical sidelink control channel, and a physical sidelink control channel corresponding to the retransmission control signaling may be referred to as a retransmission physical sidelink control channel. Similarly, a physical sidelink shared channel corresponding to the initial transmission data may be referred to as an initial transmission physical sidelink shared channel, and a physical sidelink shared channel corresponding to the retransmission data may be referred to as a retransmission physical sidelink shared channel.

Based on the implementation of the method 1, that the network device or the second terminal device schedules transmission of at least one of the data, the control signaling, or the sidelink feedback control information by using different signaling may include but is not limited to the following possible cases.

1. The first signaling is used to schedule a physical sidelink control channel, and the second signaling is used to schedule a physical sidelink shared channel. The sidelink feedback control information is carried on the physical sidelink control channel and/or the physical sidelink shared channel. With reference to the possible case, an example in which the network device or the second terminal device sends the first signaling and the second signaling to the first terminal device is used to describe the communications method provided in the present disclosure. It is assumed that a PDCCH resource used to transmit the first signaling is a CORESET 1, a PDCCH resource used to transmit the second signaling is a CORESET 2, or a PDCCH resource used to transmit the first signaling is located in a search space set 1, and a PDCCH resource used to transmit the second signaling is located in a search space set 2. After receiving the first signaling and the second signaling, the first terminal device may determine, by using the PDCCH resources corresponding to the first signaling and the second signaling, that the first signaling is used to schedule the physical sidelink control channel, and the second signaling is used to schedule the physical sidelink shared channel.

2. The first signaling is used to schedule a physical sidelink control channel, and the second signaling is used to schedule a physical sidelink feedback channel. The sidelink feedback control information is carried on the physical sidelink control channel and/or the physical sidelink feedback channel. With reference to the possible case, an example in which the network device or the second terminal device sends the first signaling and the second signaling to the first terminal device is used to describe the communications method provided in the present disclosure. It is assumed that a length of the first signaling is C, a length of the second signaling is D, and C and D are different values. After receiving the first signaling and the second signaling, the first terminal device may determine, by using the lengths of the first signaling and the second signaling, that the first signaling is used to schedule the physical sidelink control channel, and the second signaling is used to schedule the physical sidelink feedback channel. In this way, when the first signaling and the second signaling are transmitted, a same PDCCH resource may be shared, and resources are used more flexibly.

3. The first signaling is used to schedule a physical sidelink shared channel, and the second signaling is used to schedule a physical sidelink feedback channel. The sidelink feedback control information is carried on the physical sidelink shared channel and/or the physical sidelink feedback channel. With reference to the possible case, an example in which the network device or the second terminal device sends the first signaling and the second signaling to the first terminal device is used to describe the communications method provided in the present disclosure. It is assumed that CRC of the first signaling uses SFCI-RNTI scrambling and CRC of the second signaling uses C-RNTI scrambling. After receiving the first signaling and the second signaling, the first terminal device may determine, by using the RNTI scrambling used by the CRC of the first signaling and the second signaling, that the first signaling is used to schedule the physical sidelink shared channel, and the second signaling is used to schedule the physical sidelink feedback channel. In this way, blind detection by the terminal device can be reduced.

4. The first signaling is used to schedule a physical sidelink control channel and a physical sidelink shared channel, and the second signaling is used to schedule a physical sidelink feedback channel. The sidelink feedback control information is carried on at least one of the physical sidelink control channel, the physical sidelink shared channel, or the physical sidelink feedback channel. With reference to the possible case, an example in which the network device or the second terminal device sends the first signaling and the second signaling to the first terminal device is used to describe the communications method provided in the present disclosure. It is assumed that the first signaling and the second signaling each include an indication field, and the indication field is 1 bit; a value of the bit included in the first signaling is 0, and when the value of the bit is 0, it indicates that the first signaling is used to schedule the physical sidelink control channel and the physical sidelink shared channel; and a value of the bit included in the second signaling is 1, and when the value of the bit is 1, it indicates that the second signaling is used to schedule the physical sidelink feedback channel. After receiving the first signaling and the second signaling, the first terminal device may determine, by using the indication fields included in the first signaling and the second signaling, that the first signaling is used to schedule the physical sidelink control channel and the physical sidelink shared channel, and the second signaling is used to schedule the physical sidelink feedback channel.

5. The first signaling is used to schedule a physical sidelink shared channel that carries/bears the sidelink feedback control information, and the second signaling is used to schedule a physical sidelink shared channel that does not carry/bear the sidelink feedback control information. With reference to the possible case, an example in which the network device or the second terminal device sends the first signaling and the second signaling to the first terminal device is used to describe the communications method provided in the present disclosure. It is assumed that the first signaling and the second signaling each include an indication field, and the indication field is 1 bit; a value of the bit included in the first signaling is 1, and when the value of the bit is 1, it indicates that the first signaling is used to schedule the physical sidelink shared channel that carries/bears the sidelink feedback control information; and a value of the bit included in the second signaling is 0, and when the value of the bit is 0, it indicates that the second signaling is used to schedule the physical sidelink shared channel that does not carry/bear the sidelink feedback control information. After receiving the first signaling and the second signaling, the first terminal device may determine, by using the indication fields included in the first signaling and the second signaling, that the first signaling is used to schedule the physical sidelink shared channel that carries/bears the sidelink feedback control information, and the second signaling is used to schedule the physical sidelink shared channel that does not carry/bear the sidelink feedback control information.

6. The first signaling is used to schedule a physical sidelink control channel that carries/bears the sidelink feedback control information, and the second signaling is used to schedule a physical sidelink control channel that does not carry/bear the sidelink feedback control information. With reference to the possible case, an example in which the network device or the second terminal device sends the first signaling and the second signaling to the first terminal device is used to describe the communications method provided in the present disclosure. It is assumed that the first signaling and the second signaling each include an indication field, and the indication field is 1 bit; a value of the bit included in the first signaling is 1, and when the value of the bit is 1, it indicates that the first signaling is used to schedule the physical sidelink control channel that carries/bears the sidelink feedback control information; and a value of the bit included in the second signaling is 0, and when the value of the bit is 0, it indicates that the second signaling is used to schedule the physical sidelink control channel that does not carry/bear the sidelink feedback control information. After receiving the first signaling and the second signaling, the first terminal device may determine, by using the indication fields included in the first signaling and the second signaling, that the first signaling is used to schedule the physical sidelink control channel that carries/bears the sidelink feedback control information, and the second signaling is used to schedule the physical sidelink control channel that does not carry/bear the sidelink feedback control information.

7. The first signaling is used to schedule a physical sidelink feedback channel that carries CSI, or carries a HARQ-ACK, or carries the CSI and the HARQ-ACK. With reference to the possible case, an example in which the network device or the second terminal device sends the first signaling to the first terminal device is used to describe the communications method provided in the present disclosure. It is assumed that the first signaling includes an indication field, and the indication field is 2 bits; when values of the bits included in the first signaling are 00, it indicates that the first signaling is used to schedule the physical sidelink feedback channel that carries the CSI; when the values of the bits included in the first signaling are 01, it indicates that the first signaling is used to schedule the physical sidelink feedback channel that carries the HARQ-ACK; and when the values of the bits included in the first signaling are 10, it indicates that the first signaling is used to schedule the physical sidelink feedback channel that carries the CSI and the HARQ-ACK. After receiving the first signaling, the first terminal device may determine, by using the values of the indication field included in the first signaling, that the first signaling is used to schedule the physical sidelink feedback channel that carries the CSI, or carries the HARQ-ACK, or carries the CSI and the HARQ-ACK.

8. The first signaling is used to schedule a physical sidelink control channel that carries CSI, or carries a HARQ-ACK, or carries the CSI and the HARQ-ACK. With reference to the possible case, an example in which the network device or the second terminal device sends the first signaling to the first terminal device is used to describe the communications method provided in the present disclosure. It is assumed that the first signaling includes an indication field, and the indication field is 2 bits; when values of the bits included in the first signaling are 00, it indicates that the first signaling is used to schedule the physical sidelink control channel that carries the CSI; when the values of the bits included in the first signaling are 01, it indicates that the first signaling is used to schedule the physical sidelink control channel that carries the HARQ-ACK; and when the values of the bits included in the first signaling are 10, it indicates that the first signaling is used to schedule the physical sidelink control channel that carries the CSI and the HARQ-ACK. After receiving the first signaling, the first terminal device may determine, by using the values of the indication field included in the first signaling, that the first signaling is used to schedule the physical sidelink control channel that carries the CSI, or carries the HARQ-ACK, or carries the CSI and the HARQ-ACK.

9. The first signaling is used to schedule a physical sidelink shared channel that carries CSI, or carries a HARQ-ACK, or carries the CSI and the HARQ-ACK. With reference to the possible case, an example in which the network device or the second terminal device sends the first signaling to the first terminal device is used to describe the communications method provided in the present disclosure. It is assumed that the first signaling includes an indication field, and the indication field is 2 bits; when values of the bits included in the first signaling are 00, it indicates that the first signaling is used to schedule the physical sidelink shared channel that carries the CSI; when the values of the bits included in the first signaling are 01, it indicates that the first signaling is used to schedule the physical sidelink shared channel that carries the HARQ-ACK; and when the values of the bits included in the first signaling are 10, it indicates that the first signaling is used to schedule the physical sidelink shared channel that carries the CSI and the HARQ-ACK. After receiving the first signaling, the first terminal device may determine, by using the values of the indication field included in the first signaling, that the first signaling is used to schedule the physical sidelink shared channel that carries the CSI, or carries the HARQ-ACK, or carries the CSI and the HARQ-ACK.

10. The first signaling is used to schedule an initial transmission physical sidelink control channel, and the second signaling is used to schedule a retransmission physical sidelink control channel. The sidelink feedback control information is carried on the initial transmission physical sidelink control channel and/or the retransmission physical sidelink control channel.

11. The first signaling is used to schedule an initial transmission physical sidelink shared channel, and the second signaling is used to schedule a retransmission physical sidelink shared channel. The sidelink feedback control information is carried on the initial transmission physical sidelink shared channel and/or the retransmission physical sidelink shared channel.

12. The first signaling is used to schedule a physical sidelink feedback channel corresponding to an initial transmission physical sidelink shared channel, or the first signaling is used to schedule a physical sidelink feedback channel corresponding to a retransmission physical sidelink shared channel. The sidelink feedback control information is carried on the physical sidelink feedback channel. The sidelink feedback control information includes sidelink feedback control information corresponding to initial transmission data or sidelink feedback control information corresponding to retransmission data.

Method 2: The network device or the second terminal device schedules transmission of the data, the control signaling, or the sidelink feedback control information by using same signaling.

According to the method 2, in a possible implementation, the first signaling includes first indication information, the first indication information is used to indicate a first resource, and the first resource is used to transmit a first channel that carries the sidelink feedback control information. In this implementation, the first resource used to transmit the first channel that carries the sidelink feedback control information may be predefined in a protocol, or may be indicated by using one or more additional bits. This is not limited in the present disclosure.

It should be noted that, in the foregoing method 2, the first channel may be used to carry only the sidelink feedback control information. In this case, the first channel may be a dedicated channel dedicated to carry the sidelink feedback control information. For example, the dedicated channel may be referred to as a physical sidelink feedback channel. Alternatively, the first channel may be used to carry both the data and the sidelink feedback control information. In this case, the first channel may be a physical sidelink shared channel and/or a physical uplink shared channel. In this case, a transmission parameter used for the data may be the same as a transmission parameter used for the sidelink feedback control information. Alternatively, the first channel may be used to carry both the control signaling and the sidelink feedback control information. In this case, the first channel may be a physical sidelink control channel and/or a physical uplink control channel. In this case, a transmission parameter used for the control signaling may be the same as a transmission parameter used for the sidelink feedback control information.

In this embodiment of the present disclosure, the transmission parameter includes but is not limited to at least one of frequency hopping, a time domain resource, a frequency domain resource, a code domain parameter, a space domain parameter, an MCS, a user identifier, TA, transmit power control (transmission power control, TPC), a hybrid automatic repeat request (HARQ) process number, an initial transmission/retransmission indication, a redundancy version, transmission timing, a cyclic shift, an orthogonal cover code, a reference signal parameter, or an antenna port.

According to the method 2, in a possible implementation, the first signaling may further include second indication information, the second indication information is used to indicate a second resource, and the second resource is used to transmit a second channel that carries the data and/or the control signaling. When the second channel carries the control signaling, the second channel may include at least one of a physical sidelink control channel or a physical uplink control channel. When the second channel carries the data, the second channel may include at least one of a physical sidelink shared channel or a physical uplink shared channel.

In this embodiment of the present disclosure, when transmission of the first channel and the second channel is scheduled by using the first signaling, a transmission parameter of the first channel and a transmission parameter of the second channel may be separately configured or may be shared. For example, when the transmission parameter of the first channel and the transmission parameter of the second channel are separately configured, the first signaling may further include a first transmission parameter and a second transmission parameter, the first transmission parameter is used to indicate transmission of the first channel, and the second transmission parameter is used to indicate transmission of the second channel. For example, when the transmission parameter of the first channel and the transmission parameter of the second channel are shared, the first signaling may further include a first transmission parameter, and the first transmission parameter is used to indicate transmission of the first channel and the second channel.

It should be noted that the first transmission parameter and the second transmission parameter each may be one parameter or a group of parameters. When the first transmission parameter and the second transmission parameter each are a group of transmission parameters, some transmission parameters included in the first transmission parameter and the second transmission parameter may be shared, and the other transmission parameters may be separately configured. For example, assuming that the first transmission parameter includes a parameter A, a parameter B, and a parameter C, and the second transmission parameter includes the parameter A, the parameter B, and a parameter D, in the first signaling, only one field is required to indicate the parameter A, one field is required to indicate the parameter B, and two indication fields are required to indicate the parameter C and the parameter D.

According to the method 2, in a possible implementation, in addition to the first indication information and the second indication information, the first signaling may further include third indication information, the third indication information is used to indicate a third resource, and the third resource is used to transmit a third channel that carries the control signaling and/or the data.

When the third channel carries the control signaling, the third channel may include at least one of a physical sidelink control channel or a physical uplink control channel. When the third channel carries the data, the third channel may include at least one of a physical sidelink shared channel or a physical uplink shared channel.

In this embodiment of the present disclosure, when transmission of the first channel, the second channel, and the third channel is scheduled by using the first signaling, a transmission parameter of the first channel, a transmission parameter of the second channel, and a transmission parameter of the third channel may be separately configured or may be shared. For example, when the transmission parameter of the first channel, the transmission parameter of the second channel, and the transmission parameter of the third channel are shared, the first signaling may further include a third transmission parameter, and the third transmission parameter is used to indicate transmission of the first channel, the second channel, and the third channel. For example, when the transmission parameter of the first channel, the transmission parameter of the second channel, and the transmission parameter of the third channel are separately configured, the first signaling may further include a fourth transmission parameter, a fifth transmission parameter, and a sixth transmission parameter, the fourth transmission parameter is used to indicate transmission of the first channel, the fifth transmission parameter is used to indicate transmission of the second channel, and the sixth transmission parameter is used to indicate transmission of the third channel.

It should be noted that the third transmission parameter, the fourth transmission parameter, the fifth transmission parameter, and the sixth transmission parameter each may be one parameter or a group of parameters. When the fourth transmission parameter, the fifth transmission parameter, and the sixth transmission parameter each are a group of transmission parameters, some transmission parameters included in the fourth transmission parameter, the fifth transmission parameter, and the sixth transmission parameter may be shared, and the other transmission parameters may be separately configured. For example, assuming that the fourth transmission parameter includes a parameter 1, a parameter 2, a parameter 3, and a parameter 4, the fifth transmission parameter includes the parameter 1, the parameter 2, the parameter 3, and a parameter 5, and the sixth transmission parameter includes the parameter 1, the parameter 2, the parameter 3, and a parameter 6, in the first signaling, only one field is required to indicate the parameter 1, one field is required to indicate the parameter 2, and one field is required to indicate the parameter 3, and three indication fields are required to indicate the parameter 4, the parameter 5, and the parameter 6.

In this embodiment of the present disclosure, the first transmission parameter, the second transmission parameter, the third transmission parameter, the fourth transmission parameter, the fifth transmission parameter, and the sixth transmission parameter each may include, but not limiting to, at least one of frequency hopping, a time domain resource, a frequency domain resource, a code domain parameter, a space domain parameter, an MCS, a user identifier, TA, TPC, a HARQ process number, an initial transmission/retransmission indication, a redundancy version, transmission timing, a cyclic shift, an orthogonal cover code, a reference signal parameter, or an antenna port.

Based on the implementation of the method 2, that the network device or the second terminal device schedules transmission of at least one of the data, the control signaling, or the sidelink feedback control information by using same signaling may include but is not limited to the following possible cases.

1. The first signaling includes the first indication information and the second indication information, the first indication information indicates the first resource, the second indication information indicates the second resource, the first resource is used to transmit a physical sidelink control channel, and the second resource is used to transmit a physical sidelink shared channel. The sidelink feedback control information may be carried on the physical sidelink control channel and/or the physical sidelink shared channel. For example, in a possible implementation, the first resource is used to transmit a physical sidelink control channel, and the second resource is used to transmit a physical sidelink shared channel that carries/bears the sidelink feedback control information. For another example, in a possible implementation, the first resource is used to transmit a physical sidelink control channel that carries/bears the sidelink feedback control information, and the second resource is used to transmit a physical sidelink shared channel. For another example, in a possible implementation, the first resource is used to transmit a physical sidelink control channel that carries/bears the sidelink feedback control information, and the second resource is used to transmit a physical sidelink shared channel that carries/bears the sidelink feedback control information.

2. The first signaling includes the first indication information and the second indication information, the first indication information indicates the first resource, the second indication information indicates the second resource, the first resource is used to transmit a physical sidelink control channel, and the second resource is used to transmit a physical sidelink feedback channel. The sidelink feedback control information may be carried on the physical sidelink control channel and/or the physical sidelink feedback channel. For example, in a possible implementation, the first resource is used to transmit a physical sidelink control channel, and the second resource is used to transmit a physical sidelink feedback channel that carries/bears the sidelink feedback control information. For another example, in a possible implementation, the first resource is used to transmit a physical sidelink control channel that carries/bears the sidelink feedback control information, and the second resource is used to transmit a physical sidelink feedback channel. For another example, in a possible implementation, the first resource is used to transmit a physical sidelink control channel that carries/bears the sidelink feedback control information, and the second resource is used to transmit a physical sidelink feedback channel that carries/bears the sidelink feedback control information.

3. The first signaling includes the first indication information and the second indication information, the first indication information indicates the first resource, the second indication information indicates the second resource, the first resource is used to transmit a physical sidelink shared channel, and the second resource is used to transmit a physical sidelink feedback channel.

The sidelink feedback control information may be carried on the physical sidelink shared channel and/or the physical sidelink feedback channel. For example, in a possible implementation, the first resource is used to transmit a physical sidelink shared channel, and the second resource is used to transmit a physical sidelink feedback channel that carries/bears the sidelink feedback control information. For another example, in a possible implementation, the first resource is used to transmit a physical sidelink shared channel that carries/bears the sidelink feedback control information, and the second resource is used to transmit a physical sidelink feedback channel. For another example, in a possible implementation, the first resource is used to transmit a physical sidelink shared channel that carries/bears the sidelink feedback control information, and the second resource is used to transmit a physical sidelink feedback channel that carries/bears the sidelink feedback control information.

4. The first signaling includes the first indication information and the second indication information, the first indication information indicates the first resource, the second indication information indicates the second resource, the first resource is used to transmit a physical sidelink control channel and a physical sidelink shared channel, and the second resource is used to transmit a physical sidelink feedback channel. The sidelink feedback control information may be carried on at least one of the physical sidelink shared channel, the physical sidelink control channel, or the physical sidelink feedback channel. For example, in a possible implementation, the first resource is used to transmit a physical sidelink control channel and a physical sidelink shared channel, and the second resource is used to transmit a physical sidelink feedback channel that carries/bears the sidelink feedback control information. For another example, in a possible implementation, the first resource is used to transmit a physical sidelink control channel and a physical sidelink shared channel that carry/bear the sidelink feedback control information, and the second resource is used to transmit a physical sidelink feedback channel. For another example, in a possible implementation, the first resource is used to transmit a physical sidelink control channel and a physical sidelink shared channel that carry/bear the sidelink feedback control information, and the second resource is used to transmit a physical sidelink feedback channel that carries/bears the sidelink feedback control information.

5. The first signaling includes the first indication information and the second indication information, the first indication information indicates the first resource, the second indication information indicates the second resource, the first resource is used to transmit an initial transmission physical sidelink control channel, and the second resource is used to transmit a retransmission physical sidelink control channel. The sidelink feedback control information may be carried on the initial transmission physical sidelink control channel and/or the retransmission physical sidelink control channel. For example, in a possible implementation, the first resource is used to transmit an initial transmission physical sidelink control channel, and the second resource is used to transmit a retransmission physical sidelink control channel that carries/bears the sidelink feedback control information. For another example, in a possible implementation, the first resource is used to transmit an initial transmission physical sidelink control channel that carries/bears the sidelink feedback control information, and the second resource is used to transmit a retransmission physical sidelink control channel. For another example, in a possible implementation, the first resource is used to transmit an initial transmission physical sidelink control channel that carries/bears the sidelink feedback control information, and the second resource is used to transmit a retransmission physical sidelink control channel that carries/bears the sidelink feedback control information.

6. The first signaling includes the first indication information and the second indication information, the first indication information indicates the first resource, the second indication information indicates the second resource, the first resource is used to transmit an initial transmission physical sidelink shared channel, and the second resource is used to transmit a retransmission physical sidelink shared channel. The sidelink feedback control information may be carried on the initial transmission physical sidelink shared channel and/or the retransmission physical sidelink shared channel. For example, in a possible implementation, the first resource is used to transmit an initial transmission physical sidelink shared channel, and the second resource is used to transmit a retransmission physical sidelink shared channel that carries/bears the sidelink feedback control information. For another example, in a possible implementation, the first resource is used to transmit an initial transmission physical sidelink shared channel that carries/bears the sidelink feedback control information, and the second resource is used to transmit a retransmission physical sidelink shared channel. For another example, in a possible implementation, the first resource is used to transmit an initial transmission physical sidelink shared channel that carries/bears the sidelink feedback control information, and the second resource is used to transmit a retransmission physical sidelink shared channel that carries/bears the sidelink feedback control information.

7. The first signaling includes the first indication information and the second indication information, the first indication information indicates the first resource, and the second indication information indicates the second resource. The first resource is used to transmit a physical sidelink feedback channel that carries sidelink feedback control information corresponding to initial transmission data. The second resource is used to transmit a physical sidelink feedback channel that carries sidelink feedback control information corresponding to retransmission data.

8. The first signaling includes the first indication information, the second indication information, and the third indication information, the first indication information indicates the first resource, the second indication information indicates the second resource, and the third indication information indicates the third resource. The first resource is used to transmit a physical sidelink control channel, the second resource is used to transmit a physical sidelink shared channel, and the third resource is used to transmit a physical sidelink feedback channel. The sidelink feedback control information may be carried on at least one of the physical sidelink control channel, the physical sidelink shared channel, or the physical sidelink feedback channel. For example, in a possible implementation, the first resource is used to transmit a physical sidelink control channel, the second resource is used to transmit a physical sidelink shared channel, and the third resource is used to transmit a physical sidelink feedback channel that carries/bears the sidelink feedback control information. For another example, in a possible implementation, the first resource is used to transmit a physical sidelink control channel, the second resource is used to transmit a physical sidelink shared channel that carries/bears the sidelink feedback control information, and the third resource is used to transmit a physical sidelink feedback channel that carries/bears the sidelink feedback control information. For another example, in a possible implementation, the first resource is used to transmit a physical sidelink control channel that carries/bears the sidelink feedback control information, the second resource is used to transmit a physical sidelink shared channel that carries/bears the sidelink feedback control information, and the third resource is used to transmit a physical sidelink feedback channel that carries/bears the sidelink feedback control information.

9. The first signaling includes the first indication information, the second indication information, and the third indication information, the first indication information indicates the first resource, the second indication information indicates the second resource, and the third indication information indicates the third resource. The first resource is used to transmit an initial transmission physical sidelink shared channel, the second resource is used to transmit a retransmission physical sidelink shared channel, and the third resource is used to transmit a physical sidelink feedback channel. The sidelink feedback control information may be carried on at least one of the initial transmission physical sidelink shared channel, the retransmission physical sidelink shared channel, or the physical sidelink feedback channel.

In the foregoing nine possible cases, a channel that carries the sidelink feedback control information may be predefined in a protocol, or may be indicated by using one or more additional bits. This is not limited in the present disclosure.

In addition, when the network device indicates resources of a plurality of channels by using a plurality of pieces of indication information included in the first signaling, some indication information may be empty. Several possible cases are used as examples below for description.

1. The first signaling includes the first indication information and the second indication information, the first indication information indicates the first resource, the second indication information is empty, and the first resource is used to transmit a physical sidelink control channel. The sidelink feedback control information may be carried on the physical sidelink control channel.

2. The first signaling includes the first indication information and the second indication information, the first indication information indicates the first resource, the second indication information is empty, and the first resource is used to transmit a physical sidelink shared channel. The sidelink feedback control information may be carried on the physical sidelink shared channel.

3. The first signaling includes the first indication information and the second indication information, the first indication information indicates the first resource, the second indication information is empty, and the first resource is used to transmit a physical sidelink feedback channel. The sidelink feedback control information may be carried on the physical sidelink feedback channel.

4. The first signaling includes the first indication information and the second indication information, the first indication information indicates the first resource, the second indication information is empty, and the first resource is used to transmit a physical sidelink control channel and a physical sidelink shared channel. The sidelink feedback control information may be carried on the physical sidelink control channel and/or the physical sidelink shared channel.

5. The first signaling includes the first indication information and the second indication information, the first indication information indicates the first resource, the second indication information is empty, and the first resource is used to transmit a physical sidelink control channel that carries/bears the sidelink feedback control information.

6. The first signaling includes the first indication information and the second indication information, the first indication information indicates the first resource, the second indication information is empty, and the first resource is used to transmit a physical sidelink shared channel that carries/bears the sidelink feedback control information.

According to the method 2, the network device or the second terminal device may simultaneously indicate transmission resources of a plurality of channels by using the first signaling, so that workloads of blind detection and demodulation by the first terminal device can be reduced.

In this embodiment of the present disclosure, in the physical sidelink shared channel that carries/bears the sidelink feedback control information, a multiplexing manner of the SFCI and the data may be puncturing or rate matching. To be specific, the data is punctured around the SFCI, or the data rate matches around the SFCI.

In this embodiment of the present disclosure, in the physical sidelink control channel that carries/bears the sidelink feedback control information, a multiplexing manner of the SFCI and the control information may be puncturing, rate matching, or cascade. To be specific, the control information is punctured around the SFCI, the control information rate matches around the SFCI, or the SFCI and the control information are cascaded and then sent.

Figure 10:
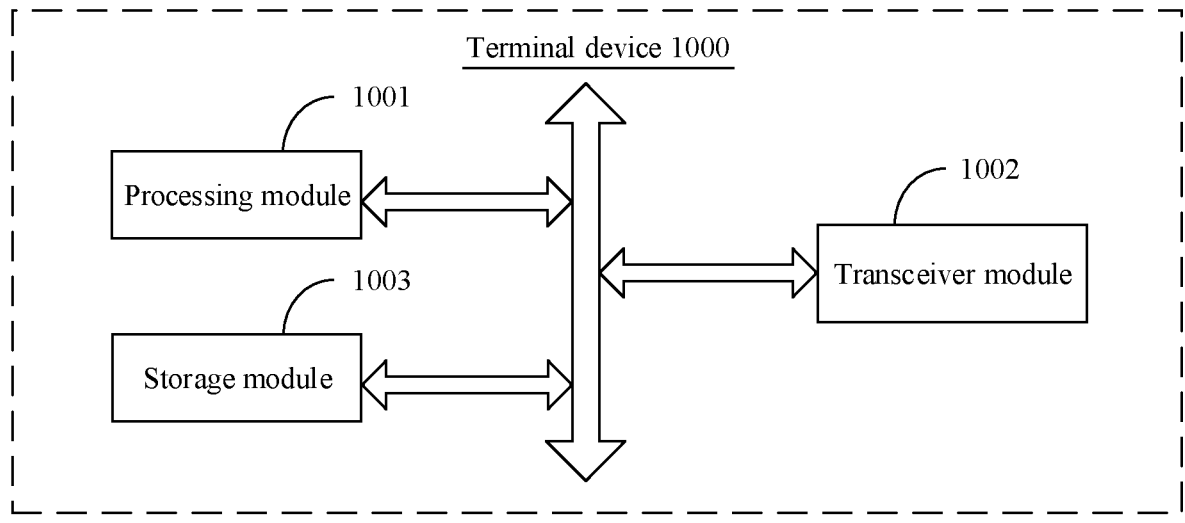
FIG. 10 is a schematic structural diagram of a terminal device according to an embodiment of the present disclosure.

Based on a same inventive concept, the embodiments of the present disclosure further provide a terminal device. The terminal device may have a structure shown in FIG. 10, and have a behavior function of the first terminal device or the second terminal device in the foregoing method embodiment. As shown in FIG. 10, the terminal device 1000 may include a processing module 1001 and a transceiver module 1002. In an implementation, the terminal device 1000 may further include a storage module 1003. The storage module 1003 may be coupled to the processing module 1001, and is configured to store a program and instructions that are necessary for the processing module 1001 to perform a function.

When the terminal device 1000 performs the behavior function of the first terminal device, according to the communications method shown in FIG. 9, the processing module 1001 in the terminal device 1000 shown in FIG. 10 may be used by the terminal device 1000 to perform the steps S102 and S103. The transceiver module 1002 may be used by the terminal device 1000 to perform the step S101.

In one embodiment of the present disclosure, the processing module 1001 determines, based on at least one of the following, that first signaling is used to schedule transmission of sidelink feedback control information:

a PDCCH resource or a PSCCH resource corresponding to the first signaling;
a length of the first signaling;
RNTI scrambling used by CRC of the first signaling; or
an indication field in the first signaling.

In one embodiment of the present disclosure, the first signaling includes first indication information, the first indication information is used to indicate a first resource, and the first resource is used to transmit a first channel that carries the sidelink feedback control information.

When the terminal device 1000 performs the behavior function of the second terminal device, according to the communications method shown in FIG. 9, the transceiver module 1002 in the terminal device 1000 shown in FIG. 10 may be used by the terminal device 1000 to perform the step S101. The processing module 1001 may be configured to generate the first signaling.

When performing the behavior function of the first terminal device or the second terminal device, the terminal device 1000 may further perform the following possible design.

In one embodiment of the present disclosure, the first channel includes at least one of a physical sidelink feedback channel, a physical sidelink shared channel, a physical sidelink control channel, a physical uplink shared channel, or a physical uplink control channel.

In one embodiment of the present disclosure, when the first channel includes a physical sidelink shared channel and/or a physical uplink shared channel, the first channel is further used to carry data, and a transmission parameter of the data is the same as a transmission parameter of the sidelink feedback control information; and/or when the first channel includes a physical sidelink control channel and/or a physical uplink control channel, the first channel is further used to carry control signaling, and a transmission parameter of the control signaling is the same as a transmission parameter of the sidelink feedback control information.

In one embodiment of the present disclosure, the first signaling further includes second indication information, the second indication information is used to indicate a second resource, and the second resource is used to transmit a second channel that carries the data and/or the control signaling.

In one embodiment of the present disclosure, when the second channel carries the control signaling, the second channel includes at least one of a physical sidelink control channel or a physical uplink control channel, and/or when the second channel carries the data, the second channel includes at least one of a physical sidelink shared channel or a physical uplink shared channel.

In one embodiment of the present disclosure, the first signaling further includes a first transmission parameter, and the first transmission parameter is used to indicate transmission of the first channel and the second channel; or the first signaling includes a first transmission parameter and a second transmission parameter, the first transmission parameter is used to indicate transmission of the first channel, and the second transmission parameter is used to indicate transmission of the second channel.

In one embodiment of the present disclosure, the first signaling further includes third indication information, the third indication information is used to indicate a third resource, and the third resource is used to transmit a third channel that carries the control signaling and/or the data.

In one embodiment of the present disclosure, when the third channel carries the control signaling, the third channel includes at least one of a physical sidelink control channel or a physical uplink control channel, and/or when the third channel carries the data, the third channel includes at least one of a physical sidelink shared channel or a physical uplink shared channel.

In one embodiment of the present disclosure, the first signaling includes a third transmission parameter, and the third transmission parameter is used to indicate transmission of the first channel, the second channel, and the third channel; or the first signaling includes a fourth transmission parameter, a fifth transmission parameter, and a sixth transmission parameter, the fourth transmission parameter is used to indicate transmission of the first channel, the fifth transmission parameter is used to indicate transmission of the second channel, and the sixth transmission parameter is used to indicate transmission of the third channel.

In one embodiment of the present disclosure, the control signaling includes initial transmission control signaling or retransmission control signaling; and/or the data includes initial transmission data or retransmission data; and/or the sidelink feedback control information includes sidelink feedback control information corresponding to the initial transmission data or sidelink feedback control information corresponding to the retransmission data.

Figure 11:
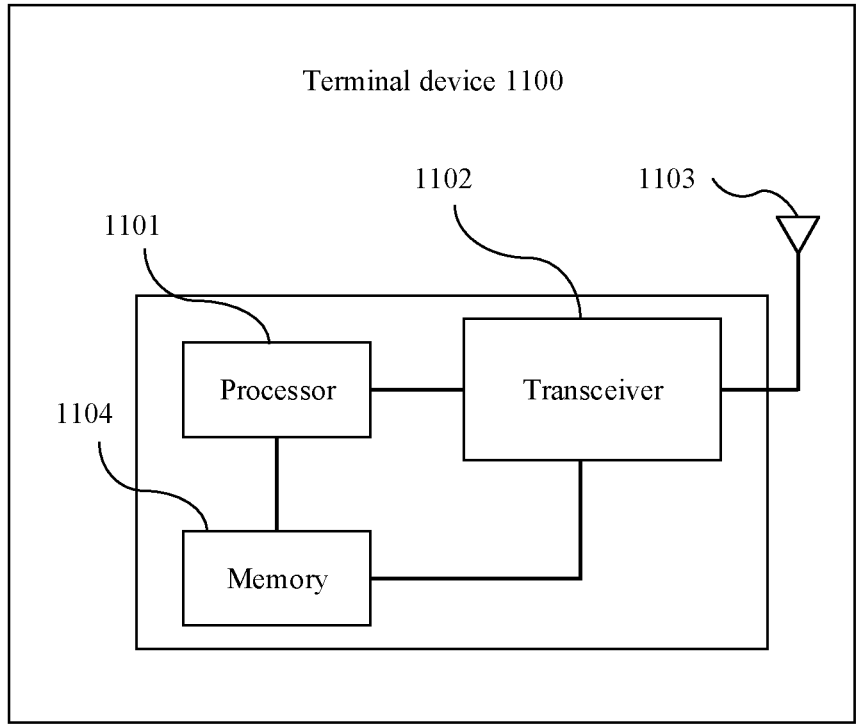
FIG. 11 is another schematic structural diagram of a terminal device according to an embodiment of the present disclosure.

In addition, the first terminal device or the second terminal device in the embodiments of the present disclosure may further have a structure of a terminal device 1100 shown in FIG. 11. A processor 1101 in the terminal device 1100 shown in FIG. 11 may be configured to implement a function of the processing module 1001. For example, the processor 1101 may be used by the terminal device 1100 to perform the steps S102 and S103. A transceiver 1102 may be configured to implement a function of the transceiver module 1002. For example, the transceiver 1102 may be used by the terminal device 1100 to perform the step S101. In addition, the transceiver 1102 may be coupled to an antenna 1103, and is configured to support the terminal device 1100 in performing communication. For example, the terminal device 1100 may further include a memory 1104. The memory 1104 stores a computer program and instructions. The memory 1104 may be coupled to the processor 1101 and/or the transceiver 1102, and is configured to support the processor 1101 in invoking the computer program and the instructions in the memory 1104, to implement steps related to the first terminal device or the second terminal device in the method provided in the embodiments of the present disclosure. In addition, the memory 1104 may further be configured to store data in the method embodiment of the present disclosure, for example, configured to store data and instructions that are necessary for supporting the transceiver 1102 in implementing interaction, and/or configured to store configuration information necessary for the terminal device 1100 to perform the method in the embodiments of the present disclosure.

Figure 12:
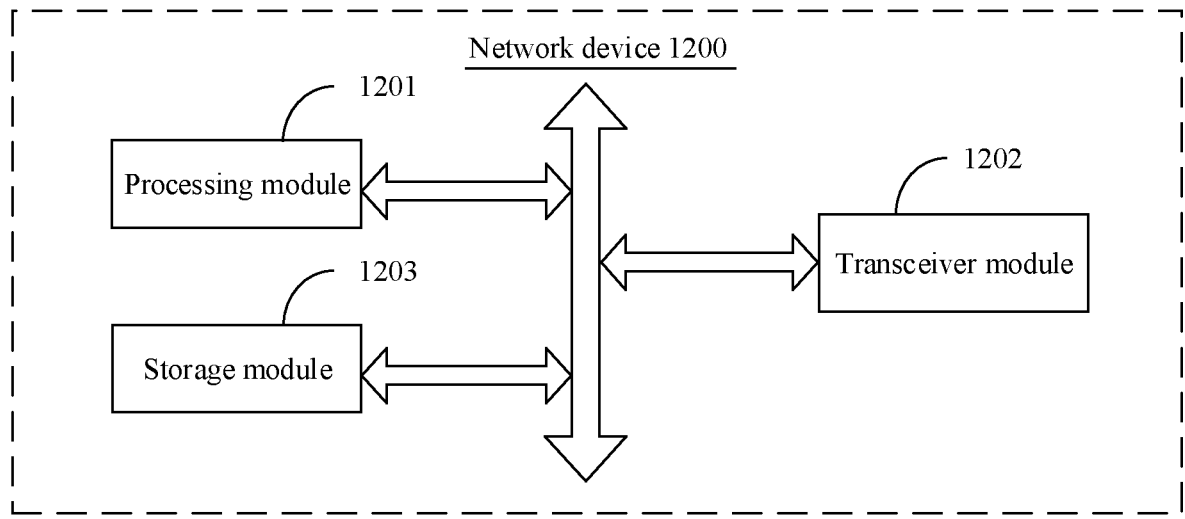
FIG. 12 is a schematic structural diagram of a network device according to an embodiment of the present disclosure.

Based on a same inventive concept, the embodiments of the present disclosure further provide a network device. The network device may have a structure shown in FIG. 12, and have a behavior function of the network device in the foregoing method embodiment. As shown in FIG. 12, the network device 1200 may include a processing module 1201 and a transceiver module 1202. In an implementation, the network device 1200 may further include a storage module 1203. The storage module 1203 may be coupled to the processing module 1201, and is configured to store a program and instructions that are necessary for the processing module 1201 to perform a function.

According to the communications method shown in FIG. 9, the transceiver module 1202 in the network device 1200 shown in FIG. 12 may be used by the network device 1200 to perform the step S101. The processing module 1201 may be used by the network device 1200 to generate first signaling.

In one embodiment of the present disclosure, at least one of the following of the first signaling is used to determine that the first signaling is used to schedule transmission of sidelink feedback control information:

a physical downlink control channel PDCCH resource or a physical sidelink control channel PSCCH resource corresponding to the first signaling;

a length of the first signaling;

radio network temporary identifier RNTI scrambling used by cyclic redundancy check CRC of the first signaling; or an indication field in the first signaling.

In one embodiment of the present disclosure, the first signaling includes first indication information, the first indication information is used to indicate a first resource, and the first resource is used to transmit a first channel that carries the sidelink feedback control information.

In one embodiment of the present disclosure, the first channel includes at least one of a physical sidelink feedback channel, a physical sidelink shared channel, a physical sidelink control channel, a physical uplink shared channel, or a physical uplink control channel.

In one embodiment of the present disclosure, when the first channel includes a physical sidelink shared channel and/or a physical uplink shared channel, the first channel is further used to carry data, and a transmission parameter of the data is the same as a transmission parameter of the sidelink feedback control information; and/or when the first channel includes a physical sidelink control channel and/or a physical uplink control channel, the first channel is further used to carry control signaling, and a transmission parameter of the control signaling is the same as a transmission parameter of the sidelink feedback control information.

In one embodiment of the present disclosure, the first signaling further includes second indication information, the second indication information is used to indicate a second resource, and the second resource is used to transmit a second channel that carries the data and/or the control signaling.

In one embodiment of the present disclosure, when the second channel carries the control signaling, the second channel includes at least one of a physical sidelink control channel or a physical uplink control channel, and/or when the second channel carries the data, the second channel includes at least one of a physical sidelink shared channel or a physical uplink shared channel.

In one embodiment of the present disclosure, the first signaling further includes a first transmission parameter, and the first transmission parameter is used to indicate transmission of the first channel and the second channel; or the first signaling includes a first transmission parameter and a second transmission parameter, the first transmission parameter is used to indicate transmission of the first channel, and the second transmission parameter is used to indicate transmission of the second channel.

In one embodiment of the present disclosure, the first signaling further includes third indication information, the third indication information is used to indicate a third resource, and the third resource is used to transmit a third channel that carries the control signaling and/or the data.

In one embodiment of the present disclosure, when the third channel carries the control signaling, the third channel includes at least one of a physical sidelink control channel or a physical uplink control channel, and/or when the third channel carries the data, the third channel includes at least one of a physical sidelink shared channel or a physical uplink shared channel.

In one embodiment of the present disclosure, the first signaling includes a third transmission parameter, and the third transmission parameter is used to indicate transmission of the first channel, the second channel, and the third channel; or the first signaling includes a fourth transmission parameter, a fifth transmission parameter, and a sixth transmission parameter, the fourth transmission parameter is used to indicate transmission of the first channel, the fifth transmission parameter is used to indicate transmission of the second channel, and the sixth transmission parameter is used to indicate transmission of the third channel.

In one embodiment of the present disclosure, the control signaling includes initial transmission control signaling or retransmission control signaling; and/or the data includes initial transmission data or retransmission data; and/or the sidelink feedback control information includes sidelink feedback control information corresponding to the initial transmission data or sidelink feedback control information corresponding to the retransmission data.

Figure 13:
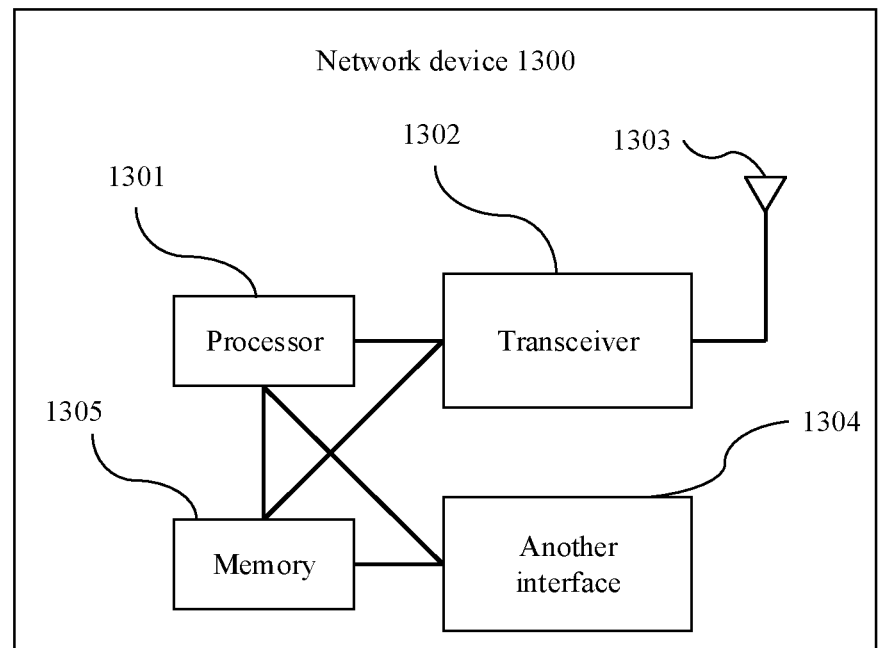
FIG. 13 is another schematic structural diagram of a network device according to an embodiment of the present disclosure.

In addition, the network device in this embodiment of the present disclosure may further have a structure of a network device 1300 shown in FIG. 13. A processor 1301 in the network device 1300 shown in FIG. 13 may be configured to implement a function of the processing module 1001. A transceiver 1302 may be configured to implement a function of the transceiver module 1002. In addition, the transceiver 1302 may be coupled to an antenna 1303, and is configured to support the network device 1300 in performing communication. For example, the network device 1300 may further include another interface 1304, configured to support the network device 1300 in interaction in a wired manner. For example, the another interface 1304 may be an optical fiber link interface, an Ethernet interface, or a copper wire interface. For example, the network device 1300 may further include a memory 1305. The memory 1305 stores a computer program and instructions. The memory 1305 may be coupled to the processor 1301 and/or the transceiver 1302, and is configured to support the processor 1301 in invoking the computer program and the instructions in the memory 1305, to implement steps related to the network device 1300 in the method provided in the embodiments of the present disclosure. In addition, the memory 1305 may further be configured to store data in the method embodiment of the present disclosure, for example, configured to store data and instructions that are necessary for supporting the transceiver 1302 in implementing interaction.

Based on a same concept as the foregoing method embodiment, the embodiments of the present disclosure further provide a computer-readable storage medium, storing some instructions. When these instructions are invoked and executed by a computer, the computer may be enabled to complete the method in any one of the foregoing method embodiment or the possible designs of the foregoing method embodiment. In this embodiment of the present disclosure, the computer-readable storage medium is not limited. For example, the computer-readable storage medium may be a RAM (random-access memory, random access memory) or a ROM (read-only memory, read-only memory).

Based on a same concept as the foregoing method embodiment, the present disclosure further provides a computer storage medium. When being invoked and executed by a computer, the computer storage medium can implement the method in any one of the foregoing method embodiment and the possible designs of the foregoing method embodiment.

Based on a same concept as the foregoing method embodiment, the present disclosure further provides a computer program product. When being invoked and executed by a computer, the computer program product can implement the method in any one of the foregoing method embodiment and the possible designs of the foregoing method embodiment.

Based on a same concept as the foregoing method embodiment, the present disclosure further provides a chip. The chip is coupled to a transceiver, and is configured to complete the method in any one of the foregoing method embodiment and the possible implementations of the foregoing method embodiment. "Coupling" means that two components are directly or indirectly combined with each other. The combination may be fixed or movable, and the combination may allow communication of a fluid, electricity, an electrical signal, or another type of signal between the two parts.

All or some of the foregoing embodiments may be implemented by using software, hardware, firmware, or any combination thereof. When the embodiments are implemented by using software, all or some of the embodiments may be implemented in a form of a computer program product. The computer program product includes one or more computer instructions. When the computer program instructions are loaded and executed on a computer, the procedures or functions according to the embodiments of the present invention are completely or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of the present disclosure may implement or operate the described functions through a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may also be any conventional processor, controller, microcontroller, or state machine. The processor may also be implemented by a combination of computing apparatuses, such as a digital signal processor and a microprocessor, a plurality of microprocessors, one or more microprocessors with a digital signal processor core, or any other similar configuration.

Steps of the methods or algorithms described in the embodiments of the present disclosure may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor so that the processor may read information from the storage medium and write information to the storage medium. Optionally, the storage medium may further be integrated into a processor. The processor and the storage medium may be arranged in the ASIC, and the ASIC may be arranged in a terminal device. Optionally, the processor and the storage medium may alternatively be arranged in different components of the terminal device.

The computer program instructions may alternatively be loaded onto a computer or another programmable data processing device, so that a series of operations and steps are performed on the computer or another programmable device, to generate computer-implemented processing. Therefore, the instructions executed on the computer or the another programmable device provide steps for implementing a specified function in one or more procedures in the flowcharts and/or in one or more blocks in the block diagrams.

Although the present invention is described with reference to specific features and the embodiments thereof, it is clear that various modifications and combinations may be made to them without departing from the spirit and scope of the present invention. Correspondingly, the specification and accompanying drawings are merely example descriptions of the present invention defined by the appended claims, and are considered as any of or all modifications, variations, combinations or equivalents that cover the scope of the present invention. It is clear that a person skilled in the art can make various modifications and variations to the present invention without departing from the spirit and scope of the present invention. The present invention is intended to cover these modifications and variations provided that these modifications and variations fall within the scope of protection defined by the following claims and their equivalent technologies.

What is claimed is:

1. A communications method by a first terminal device for a sidelink communication, comprising:
  receiving first signaling from a network device wherein the first signaling is used to schedule transmission of a sidelink feedback control information (SFCI); and
  the first signaling comprises downlink control information (DCI) from a network device in a physical downlink control channel (PDCCH) which indicates:
    resources for the first terminal to use for sidelink control and data; and
    resources for the first terminal to use for sending HARQ ACK information received from another terminal via sidelink communications back to the network device;
  scheduling sidelink transmission of data and/or control signaling;
  transmitting, via the sidelink, the data and/or control signaling;

in response to the transmitting, receiving the SFCI including the HARQ ACK from a second terminal device based on the first signaling; and
  scheduling transmission of the SFCI, based on the DCI, to the network device, wherein the SFCI includes the HARQ ACK.

2. The method according to claim 1, wherein the first terminal device determines, at least one of the following:
  a PDCCH resource or a physical sidelink control channel (PSCCH) resource corresponding to the first signaling;
  a length of the first signaling;
  radio network temporary identifier RNTI scrambling used by cyclic redundancy check CRC of the first signaling; or
  an indication field in the first signaling.

3. The method according to claim 1, wherein:
  a length of the first signaling is different from a length of the second signaling; and
  the first signaling comprises first indication information that indicates a first resource that is used to transmit a first channel that carries the sidelink feedback control information.

4. The method according to claim 3, wherein the first channel comprises at least one of a physical sidelink feedback channel, a physical sidelink shared channel, a physical sidelink control channel, a physical uplink shared channel, or a physical uplink control channel.

5. The method according to claim 4, wherein when the first channel comprises a physical sidelink shared channel and/or a physical uplink shared channel, the first channel is further used to carry data, and a transmission parameter of the data is the same as a transmission parameter of the sidelink feedback control information; and/or
  when the first channel comprises a physical sidelink control channel and/or a physical uplink control channel, the first channel is further used to carry control signaling, and a transmission parameter of the control signaling is the same as the transmission parameter of the sidelink feedback control information.

6. A communications method for a sidelink communication, comprising:
  generating, by a network device, first signaling comprising down link control information (DCI) in a physical downlink control channel (PDCCH) for a first terminal device, wherein the first signaling is used by the user terminal to schedule transmission of sidelink feedback control information, wherein the first signaling indicates resources for the first terminal to use for sending HARQ ACK information received from another terminal via sidelink communications back to the network device; and
  the sidelink feedback control information comprises at least one of channel state information, a receiving response, or a scheduling request and wherein the second signaling is for scheduling transmission of data and/or control signaling; and
  sending, by the network device or a second terminal device, the first signaling to the first terminal device to enable the first terminal device to produce data and/or control signaling to the second terminal device over a side link and to enable the first terminal device to report HARQ ACK information received from the second terminal device.

7. The method according to claim 6, wherein at least one of the following of the first signaling is used by the first terminal device to determine that the first signaling is used to schedule transmission of the sidelink feedback control information:

a physical downlink control channel PDCCH resource or a physical sidelink control channel PSCCH resource corresponding to the first signaling;
  a length of the first signaling;
  radio network temporary identifier RNTI scrambling used by cyclic redundancy check CRC of the first signaling; or
  an indication field in the first signaling.

8. The method according to claim 6, wherein the first signaling comprises first indication information, the first indication information is used to indicate a first resource, and the first resource is used to transmit a first channel that carries the sidelink feedback control information.

9. The method according to claim 8, wherein the first channel comprises at least one of a physical sidelink feedback channel, a physical sidelink shared channel, a physical sidelink control channel, a physical uplink shared channel, or a physical uplink control channel.

10. The method according to claim 9, wherein when the first channel comprises a physical sidelink shared channel and/or a physical uplink shared channel, the first channel is further used to carry data, and a transmission parameter of the data is the same as a transmission parameter of the sidelink feedback control information; and/or
  when the first channel comprises a physical sidelink control channel and/or a physical uplink control channel, the first channel is further used to carry control signaling, and a transmission parameter of the control signaling is the same as the transmission parameter of the sidelink feedback control information.

11. A communications apparatus, comprising:
  a memory storage comprising instructions; and
  one or more processors in communication with the memory storage, wherein the execution of the instructions by the one or more processors causes the apparatus to:
  receive first signaling from a network device or a second terminal device wherein the first signaling is used to schedule transmission of the sidelink feedback control information and comprises down link control information (DCI) from a network device in a physical downlink control channel (PDCCH) which indicates:
  resources for the first terminal to use for sidelink control and data; and
  resources for the first terminal to use for sending sidelink feedback control information received from another terminal via sidelink communications back to the network device, the sidelink feedback control information comprising at least one of HARQ ACK information,
  channel state information, a receiving response, or a scheduling request;
  transmit the data and/or control signaling via the sidelink.

12. The apparatus according to claim 11, wherein the execution of the instructions by the one or more processors causes the apparatus to determine, based on at least one of the following, that the first signaling is used to schedule transmission of the sidelink feedback control information:
  a physical downlink control channel PDCCH resource or a physical sidelink control channel PSCCH resource corresponding to the first signaling;
  a length of the first signaling;

radio network temporary identifier RNTI scrambling used by cyclic redundancy check CRC of the first signaling; or
  an indication field in the first signaling.

13. The apparatus according to claim 11, wherein:
  the first signaling comprises first indication information, the first indication information is used to indicate a first resource, and the first resource is used to transmit a first channel that carries the sidelink feedback control information.

14. The apparatus according to claim 13, wherein the first channel comprises at least one of a physical sidelink feedback channel, a physical sidelink shared channel, a physical sidelink control channel, a physical uplink shared channel, or a physical uplink control channel.

15. The apparatus according to claim 14, wherein when the first channel comprises a physical sidelink shared channel and/or a physical uplink shared channel, the first channel is further used to carry data, and a transmission parameter of the data is the same as a transmission parameter of the sidelink feedback control information; and/or
  when the first channel comprises a physical sidelink control channel and/or a physical uplink control channel, the first channel is further used to carry control signaling, and a transmission parameter of the control signaling is the same as the transmission parameter of the sidelink feedback control information.

16. A communications apparatus, comprising:
  a memory storage comprising instructions; and
  one or more processors in communication with the memory storage, wherein the execution of the instructions by the one or more processors causes the apparatus to:
  generate first signaling comprising down link control information (DCI) in a physical downlink control channel (PDCCH) for a first terminal device, wherein the first signaling is used to schedule transmission of sidelink feedback control information, wherein the first signaling indicates resources for the first terminal to use for sending HARQ ACK information received from another terminal via sidelink communications back to the network device; and the sidelink feedback control information comprises at least one of channel state information, a response to a received message, or a scheduling request; and
  send the first signaling to the first terminal device to enable the first terminal device to report HARQ ACK information received from a second terminal device over a sidelink.

17. The apparatus according to claim 16, wherein at least one of the following of the first signaling is used to determine that the first signaling is used to schedule transmission of the sidelink feedback control information:
  a physical downlink control channel PDCCH resource or a physical sidelink control channel PSCCH resource corresponding to the first signaling;
  a length of the first signaling;
  radio network temporary identifier RNTI scrambling used by cyclic redundancy check CRC of the first signaling; or
  an indication field in the first signaling.

18. The apparatus according to claim 16, wherein:
  a length of the first signaling is different from a length of the second signaling; and
  the first signaling comprises first indication information, the first indication information is used to indicate a first resource, and the first resource is used to transmit a first channel that carries the sidelink feedback control information.

19. The apparatus according to claim 18, wherein the first channel comprises at least one of a physical sidelink feedback channel, a physical sidelink shared channel, a physical sidelink control channel, a physical uplink shared channel, or a physical uplink control channel.

20. The apparatus according to claim 19, wherein when the first channel comprises a physical sidelink shared channel and/or a physical uplink shared channel, the first channel is further used to carry data, and a transmission parameter of the data is the same as a transmission parameter of the sidelink feedback control information; and/or when the first channel comprises a physical sidelink control channel and/or a physical uplink control channel, the first channel is further used to carry control signaling, and a transmission parameter of the control signaling is the same as the transmission parameter of the sidelink feedback control information.

* * * * *